United States Patent
Hopper et al.

(10) Patent No.: US 11,125,865 B2
(45) Date of Patent: Sep. 21, 2021

(54) AIRBORNE TOPO-BATHY LIDAR SYSTEM AND METHODS THEREOF

(71) Applicant: Woolpert, Inc., Dayton, OH (US)

(72) Inventors: Nathan Lee Hopper, Diamondhead, MS (US); Joseph R. Seppi, McLean, VA (US); Rodney Ross Faulkner, II, Diamondhead, MS (US); Mark Douglas Smits, II, Diamondhead, MS (US); JoongYong Park, Slidell, LA (US); Mark Stephen Millman, Anacortes, WA (US); Eric Josef Cahoon, Woodbridge, VA (US); Christopher T. Cotton, Honeoye Falls, NY (US); Joshua Gluckman, Columbia, MD (US); Alexander Cheff Halterman, San Diego, CA (US); Grady Tuell, Madison, GA (US); Andrew Wallace Stark, New Orleans, LA (US); John Henry Gerhard, Littleton, CO (US); William Jeffrey Lillycrop, Gulf Breeze, FL (US)

(73) Assignee: Woolpert, Inc., Dayton, OH (US)

(*) Notice: Subject to any disclaimer, the term of this patent is extended or adjusted under 35 U.S.C. 154(b) by 0 days.

(21) Appl. No.: 16/889,087

(22) Filed: Jun. 1, 2020

(65) Prior Publication Data

US 2021/0055418 A1 Feb. 25, 2021

Related U.S. Application Data

(60) Provisional application No. 62/854,571, filed on May 30, 2019.

(51) Int. Cl.
*G01S 7/48* (2006.01)
*G01S 7/51* (2006.01)
(Continued)

(52) U.S. Cl.
CPC ............. *G01S 7/51* (2013.01); *B64C 39/02* (2013.01); *G01S 7/4808* (2013.01);
(Continued)

(58) Field of Classification Search
USPC ........................................................ 356/5.04
See application file for complete search history.

(56) References Cited

U.S. PATENT DOCUMENTS

| | | | | |
|---|---|---|---|---|
| 4,277,167 A | * | 7/1981 | Eppel | G01S 17/89 356/5.02 |
| 4,518,254 A | * | 5/1985 | Penny | G01S 7/497 356/5.08 |

(Continued)

FOREIGN PATENT DOCUMENTS

| | | | | |
|---|---|---|---|---|
| EP | 2921879 A1 | | 9/2015 | |
| EP | 3460520 A1 | * | 3/2019 | ........... G01C 15/002 |
| WO | 2020251787 A2 | | 12/2020 | |

OTHER PUBLICATIONS

Philpot, William et al.; BBII Airborne Laser Hydrography (Blue Book II), Oct. 2019; 290 pages.

(Continued)

*Primary Examiner* — James R Hulka
(74) *Attorney, Agent, or Firm* — Ulmer & Berne LLP

(57) ABSTRACT

Airborne LiDAR bathymetry systems and methods of use are provided. The airborne LiDAR bathymetry system can collect topographic data and bathymetric data at high altitudes. The airborne LiDAR bathymetry system has a receiver system, a detector system, and a laser transmission system.

18 Claims, 17 Drawing Sheets

(51) Int. Cl.
*B64C 39/02* (2006.01)
*G01S 7/481* (2006.01)
*G01S 7/4863* (2020.01)
*G01S 17/89* (2020.01)

(52) U.S. Cl.
CPC .......... *G01S 7/4816* (2013.01); *G01S 7/4863* (2013.01); *G01S 17/89* (2013.01); *B64C 2201/123* (2013.01); *G01S 2205/03* (2020.05)

(56) References Cited

U.S. PATENT DOCUMENTS

| | | | | |
|---|---|---|---|---|
| 4,967,270 | A * | 10/1990 | Ulich | G01S 17/18 |
| | | | | 348/31 |
| 4,986,656 | A * | 1/1991 | Sweeney | G01J 3/44 |
| | | | | 356/301 |
| 5,243,541 | A * | 9/1993 | Ulich | G01S 7/487 |
| | | | | 348/31 |
| 5,457,639 | A * | 10/1995 | Ulich | G01S 17/18 |
| | | | | 356/5.1 |
| 6,411,371 | B1 | 6/2002 | Hinderling et al. | |
| 6,928,194 | B2 * | 8/2005 | Mai | G06T 3/4038 |
| | | | | 345/630 |
| 7,187,452 | B2 * | 3/2007 | Jupp | G01S 7/497 |
| | | | | 356/501 |
| 7,248,342 | B1 * | 7/2007 | Degnan | G01C 3/08 |
| | | | | 342/120 |
| 7,580,127 | B1 * | 8/2009 | Mayor | G01S 17/95 |
| | | | | 356/337 |
| 8,493,445 | B2 * | 7/2013 | Degnan, III | G01S 17/89 |
| | | | | 348/144 |
| 9,476,980 | B2 * | 10/2016 | Thayer | G01S 7/499 |
| 10,094,925 | B1 * | 10/2018 | LaChapelle | G01S 7/497 |
| 10,300,852 | B2 * | 5/2019 | Cund | G01F 23/2928 |
| 10,338,608 | B2 * | 7/2019 | Wang | G05D 1/042 |
| 10,656,250 | B2 | 5/2020 | Wasilousky et al. | |
| 10,684,362 | B2 * | 6/2020 | Thayer | G01S 17/10 |
| 2004/0130702 | A1 | 7/2004 | Jupp et al. | |
| 2007/0279615 | A1 | 12/2007 | Degnan et al. | |
| 2014/0146303 | A1 * | 5/2014 | Mitchell | G01S 17/08 |
| | | | | 356/5.01 |
| 2016/0214534 | A1 * | 7/2016 | Richards | H04N 13/204 |
| 2016/0223671 | A1 * | 8/2016 | Thayer | G01C 13/008 |
| 2017/0184399 | A1 * | 6/2017 | Thayer | G01S 7/499 |
| 2018/0284274 | A1 | 10/2018 | LaChapelle | |
| 2019/0018143 | A1 * | 1/2019 | Thayer | G01S 17/89 |
| 2019/0094346 | A1 | 3/2019 | Dumoulin et al. | |
| 2019/0107605 | A1 | 4/2019 | Wasilousky et al. | |
| 2019/0265361 | A1 * | 8/2019 | Ngoroi | G01S 17/89 |

OTHER PUBLICATIONS

Quadros, Nathan D.; Unlocking the Characteristics of Bathymetric LiDAR Sensors; LiDAR Magazine, vol. 3, No. 6; Copyright 2013; 4 pages.

Young, Lee; International Search Report and Written Opinion of the International Searching Authority issued in International Application No. PCT/US2020/035454; dated Feb. 2, 2021; 14 pages.

* cited by examiner

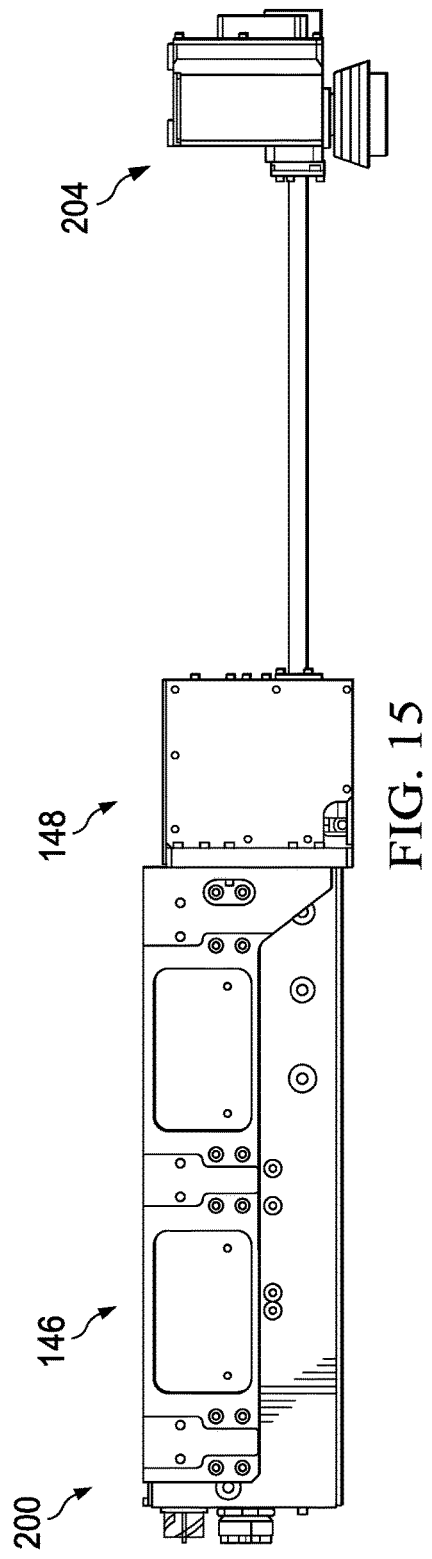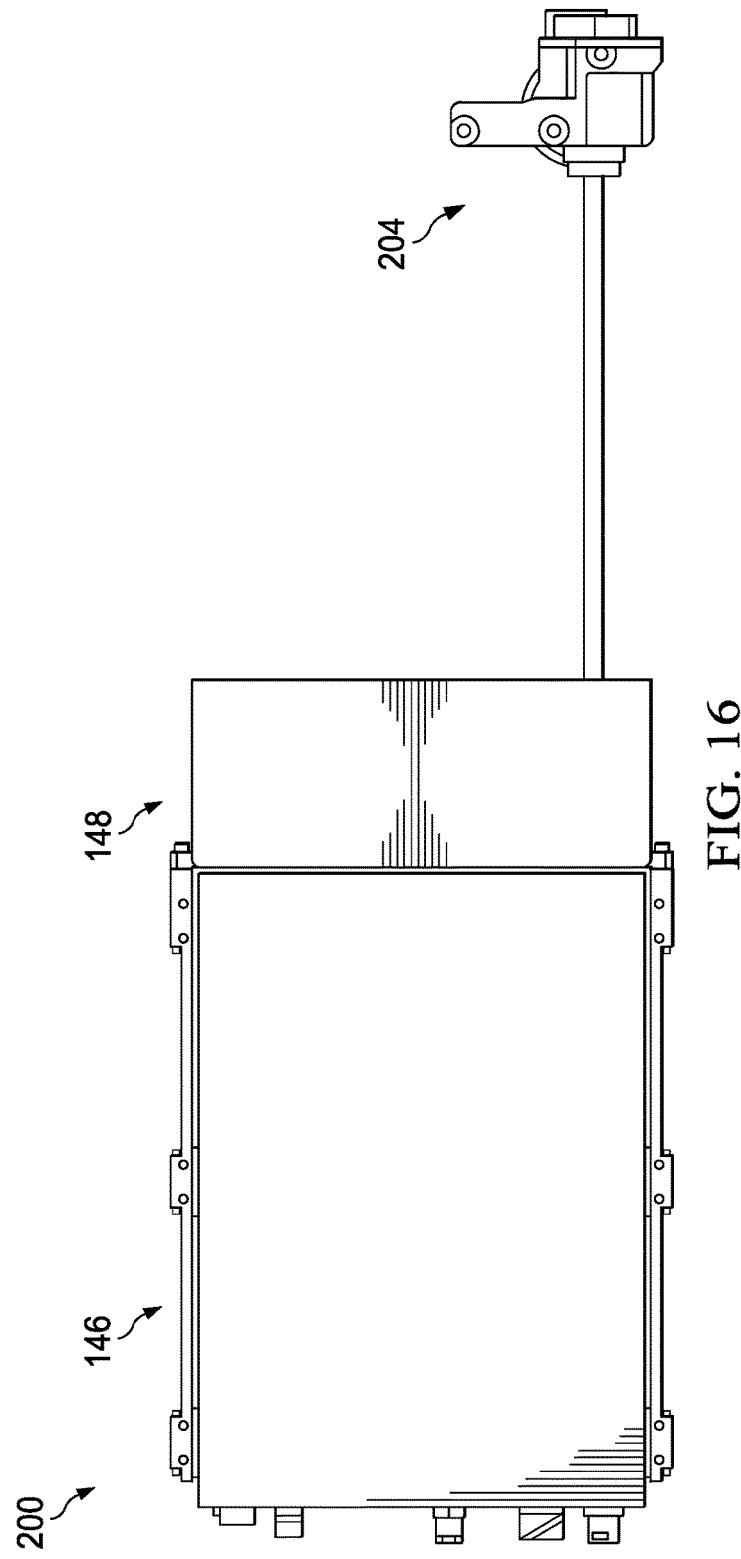

AIRBORNE TOPO-BATHY LIDAR SYSTEM AND METHODS THEREOF

CROSS-REFERENCE TO RELATED APPLICATION

This application claims the benefit of U.S. provisional patent application Ser. No. 62/854,571, filed on May 30, 2019, entitled Airborne Topo-Bathy LiDAR SYSTEM and Methods Thereof, the disclosure of which is incorporated herein by reference in its entirety.

STATEMENT REGARDING FEDERALLY SPONSORED RESEARCH OR DEVELOPMENT

This invention was made with government support under contract W9127817D0068 awarded by the U.S. Army Corps of Engineers. The government has certain rights in the invention

BACKGROUND

Airborne LiDAR instruments scan a pulsed laser to collect ranging measurements of the distance to the ground. When combined with position and altitude obtained from integrated GPS receivers and Inertial Measurement Units, detailed elevation mapping products are generated. LiDAR is a mature technology that is routinely used for aerial topographic surveys. Current advancements in aerial LiDAR technology have led to increased collection rates, higher mapping densities, and higher operational altitudes. State-of-the-art systems record millions of elevation measurements per second and operate at altitudes over 7000 meters. While topographic LiDAR systems are capable of these specifications, bathymetric LiDAR systems designed to survey the seafloor record elevations at much lower rates in the kHz range, and operate at much lower altitudes in the 200-500 meter range.

BRIEF DESCRIPTION OF THE DRAWING

Various embodiments will become better understood with regard to the following description, appended claims and accompanying drawings wherein:

FIG. 15 depicts a side view of an example laser transmission system in accordance with a non-limiting embodiment.

FIG. 16 depicts a top view of the laser transmission system of FIG. 15.

DETAILED DESCRIPTION

Figure 1:
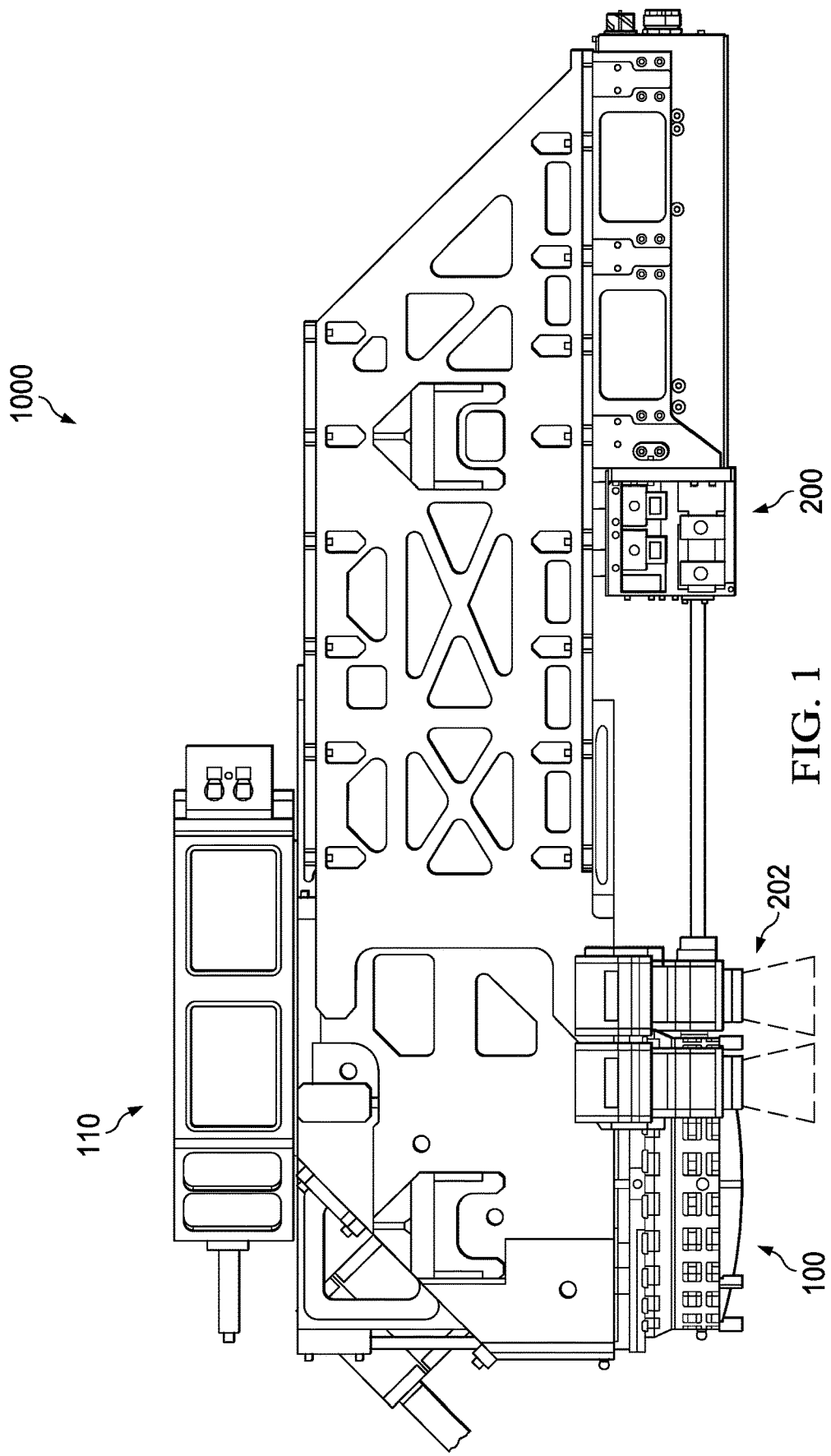
FIG. 1 is a side view of an airborne LiDAR bathymetry (ALB) system in accordance with one non-limiting embodiment.

Various non-limiting embodiments of the present disclosure will now be described to provide an overall understanding of the principles of the structure, function, and use of a high altitude topo-bathy LiDAR system as disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Airborne LiDAR bathymetry (ALB) is an established and effective technique for measuring depths of coastal waters. Pioneering work by Guenther led to the development of the first ALB systems in the 1980s. The basic principle of LiDAR bathymetry is to record measurements from a scanned, pulsed, water penetrating green laser. A green laser is used for sea bottom detection because blue-green wavelengths penetrate typical coastal waters with the least attenuation. Once the surface of the water is detected the distance to the seafloor is calculated from the time difference and knowledge of the speed of light in both air and water. The speed of light in water is roughly a third slower than in air and this bias must be corrected. Thus accurate determination of ranging distance is dependent on reliable detection of both the water surface and the sea floor from the waveform of the laser return pulse.

The waveform of the received green laser pulse is the superposition of a number of effects including interaction of the laser pulse at the air-water interface, volume scattering as the laser traverses the water column, and reflection of the laser at the seafloor. At the air-water interface on both the transmit path and the receive path, a portion of the energy of the laser pulse is reflected and the remaining energy is transmitted as determined by the Fresnel equations. For an ideally level sea surface the one-way Fresnel reflection is 2-3% for typical ALB off-nadir laser beam angles. However, the sea surface is never flat and even at low wind speeds the reflectance of water is treated as a rough surface and typically modeled using a micro-faceted bidirectional reflectance distribution function (BRDF). The BRDF includes both a diffuse component and a specular lobe that increases in amplitude with water surface roughness which in turn is modeled as a function of wind speed. As the laser pulse travels through the water column, volume scattering and absorption attenuate the laser energy. A portion of the scattering is reflected back along the receive path. This backscatter is also a component of the received LiDAR waveform. The third component of the laser waveform is the bottom return from the diffuse reflection of the seafloor of the attenuated laser light. Once attenuation results in a bottom return with magnitude below the noise threshold and/or the backscatter return, bottom detection is no longer possible. Refraction at the air-water interface and multiple scattering result in a stretched pulse return from the bottom. In the presence of all of these effects, detecting and localizing the sea-floor bottom is a challenging signal processing task.

In addition to the green waveform return, bathymetric systems also may take advantage of the red shifted laser return that results from Raman backscatter of the green laser in the water column. Detection of this signal can aid in the determination of the water surface due to the fact that Raman scattering is minimally affected by wind speed and sea surface waves. Some bathymetric and topo-bathy systems also employ an IR laser which does not penetrate the water but provides reliable detection of the water surface in addition to topographic measurements.

Although some laser energy is lost from the Fresnel reflection at the air-water interface, the dominant effect of laser attenuation is the scattering and absorption of light along the water column. The transmittance of light in water is governed by the Beer-Lambert law which follows an exponential decay and is expressed as:

$$E(z) = E_0 e^{(-K_d z)}$$

where $E(z)$ is the irradiance at depth z, and $E_0$ is the irradiance at the water surface. The term $K_d$ is the diffuse attenuation coefficient and, in the field of ocean optics, is a well-studied apparent optical property of water. The diffuse attenuation coefficient varies with water clarity, and it is an indicator of the forward transmission of radiation in water. The diffuse attenuation coefficient is defined as:

$$K_d = -\frac{1}{E_d}\frac{dE_d}{dz}$$

where the term $E_d$ is the planar down-welling irradiance. The value of $K_d$ varies with wavelength, and for coastal water has a minimum near 532 nm which corresponds to the wavelength of many common frequency doubled, solid-state Nd:YAG lasers. For typical clear coastal waters $K_d = 0.1$ m$^{-1}$ while murky, near-shore waters have a coefficient closer to $K_d = 0.4$ m$^{-1}$.

To mitigate the effects of laser attenuation and penetrate coastal waters, most ALB systems use a high power green laser. Typical laser power per pulse for ALB systems is around 5 mJ as compared to typical topographic systems which are on the order of 100 uJ. The receiver's aperture size can also be increased to gather more light; however, difficulties in manufacturing large telescope mirrors, instrument size, and platform constraints place limits on increasing aperture size. Additionally, keeping system electronic noise to a minimum and improving detector sensitivity can increase the depth penetration of the LiDAR. Operational altitude has a considerable impact on water penetration due to the inverse square law relating the received laser power to the transmitted laser power. For this reason ALB systems operate at low altitudes in the range of 200-500 meters above the water. For a variety of reasons, further reducing altitude is difficult and would lead to an unacceptably small swath. Unlike topographic LiDAR a wide scanning angle with a large off-nadir beam angle is not practical for ALB.

The depth penetration capability of an ALB system is typically expressed as $d_{max} = n/K_d$. A well designed ALB instrument will have a value for n in the range of 2-4 for daytime operation and 3-5 for night time operation. For example, a system with $d_{max} = 4/K_d$ would be able to penetrate 40 m in typical coastal waters where $K_d = 0.1$ m$^{-1}$. Note that even if sufficient laser light reaches the sea bottom, the albedo, or reflectance, of the seafloor has a considerable impact on the ability of an ALB system to resolve the bottom from a waveform.

In addition to the attenuation of light, water alters the off-nadir angle of the laser beam via refraction. Although correcting for refraction is a straightforward application of Snell's Law, depending on the level of accuracy required it may be necessary to carefully model surface waves. Another challenge in LiDAR bathymetry is to disambiguate the water surface from the bottom in very shallow waters where the surface and bottom return merge. To this end a short pulse width laser is helpful as are high-bandwidth, low-noise receiver electronics which yield a narrow system transfer function in the spatial domain.

Laser, telescope, scanner, detector, and GPS/IMU are the primary components of a LiDAR mapping system. Bathymetric and topo-bathy systems have specific requirements for most of these components. Bathy systems typically use a high powered, frequency doubled, solid state Nd:YAG laser. As compared to topographic systems these lasers are operated at a much lower pulse rate. The combination of high power ~30 W and low pulse rate ~10 kHz results in laser pulse energies on the order of 3 mJ which are needed for water penetration. To improve surface and bottom detection, and to minimize the effects of pulse stretching, short laser pulses of a few ns or less are used. IR lasers are often used in conjunction with green lasers to aid in surface detection and provide topographic measurements. Frequency doubled lasers can be used to emit aligned IR (1064 nm) and green (532 nm) beams.

The telescopes in ALB systems use large apertures to gather more light, which in turn requires a large diameter scanner. Due to the effects of refraction and the high variability of surface returns as function of the angle of incidence, most ALB systems use a scanner with a fixed or narrow range of off-nadir beam angles, typically around 15-20 degrees. Linear scan patterns are avoided in favor of circular, semi-circular, or elliptical scan patterns. Nutating mirrors, Risley prisms, wedge prisms, and Fresnel prisms can be used to design scanners with these patterns.

Photomultiplier tubes (PMT) are often chosen as detectors in order to handle the large dynamic range of bathymetric returns. PMTs are able to maintain a linear response over several orders of magnitude. Despite the high dynamic range of PMTs, care must be taken to avoid after-pulsing and possible detector damage from high energy returns. Another common ALB detector design is the use of multiple channels to either segment the field of view spatially or to increase dynamic range via beam splitters.

The high power lasers used in ALB systems require significant cooling. The need for thermal management in addition to the large telescopes and scanners can place constraints on Size, Weight and Power (SWaP). Designing low power and smaller footprint systems is one of the coming challenges of future bathymetric LiDAR systems.

High altitude bathymetry has challenges. Currently, operational and commercially available ALB systems operate at low altitudes in the range of 200 m-500 m. This is far below the altitudes of topographic LiDAR systems, which routinely operate in the range of 1500 m-3500 m or higher. Increasing the operational altitude of ALB systems to 3000 m presents several challenges that require novel approaches. The primary difficulty is the loss of laser power from the inverse square law and atmospheric attenuation. From the LiDAR equation $$P_r \cong P_t C_L \frac{\rho}{h^2} T(h; \lambda)$$

where $P_r$ is the received optical power, $P_t$ is the transmitted optical power, and $C_L$ is the LiDAR constant that depends only on the physical properties of the sensor, the received optical power falls by $$\frac{1}{h^2}$$

where h is the altitude. This inverse square fall-off is derived from the decreasing solid angle that is subtended by the aperture of the telescope as altitude is increased. The received optical power is further attenuated by T, the two-way atmospheric transmission attenuation factor which depends on $\lambda$, the laser wavelength. In the visible wavelengths, T is mostly due to Rayleigh scattering in the atmosphere. Bathymetric systems, which require a green laser, suffer from greater attenuation than IR based topographic systems due to the spectral dependence of Rayleigh scattering.

To scale an existing ALB design from operating at 500 m to 3000 m would require a 36× increase in laser power to account for the loss of energy from $$\frac{1}{h^2}.$$

Atmospheric attenuation of laser power at 532 nm on a clear day is around 0.85 at an altitude of 3 km, while attenuation at 500 m is approximately 0.97. Combined with the inverse square fall-off, a 40× increase in laser power is required to scale an existing design. Given the high power lasers—greater than 10 W—that are used in ALB systems at 500 m, a 40 fold increase is not a feasible solution.

Another challenge is the need to maintain point density as altitude is increased. Moving from 500 m to 3000 m requires a 6 fold increase in measurement rate to maintain point density. This can be accomplished by increasing the pulse rate of the laser, increasing the number of lasers, and/or using an arrayed detector to increase the number of receiver channels. To maintain pulse energy per receiver channel a corresponding 6× increase in total laser power is needed. This would require kWs of laser power to maintain depth penetration and point density at high altitude using conventional detector and laser technology.

Maintaining geo-location accuracy is another difficulty when designing high altitude systems. As altitude is increased angular pointing errors and biases are magnified. For topographic LiDAR systems biases can be calibrated and angular pointing errors reduced in software during post-processing. Existing commercial software packages are designed for topographic LiDAR and cannot be leveraged. New methods for calibrating biases and improving pointing accuracy for bathymetric point clouds are needed.

With practical limits on laser power, a high altitude ALB system must rely on specialized detector technology. In addition, scanner design and post-processing are important criteria for developing a solution to high altitude bathymetry.

Due to their ability to detect weak optical signals, both photomultiplier tubes (PMT) and avalanche photodiodes (APD) are commonly used detectors in LiDAR systems. Typically these devices are operated in analogue mode and used to measure the waveform of the received laser pulse. For ALB where a high dynamic range is needed, the PMT is the detector of choice. On the other hand, most topographic systems employ APDs.

PMTs can be used to detect very faint signals down to a single photon; however, they require an external power source with high voltage. When APDs are operated with a bias above the breakdown voltage, in so called Geiger mode, they are also capable of detecting single photons and are referred to as single-photon avalanche diodes (SPAD) or Geiger mode APD (G-APD). Both SPAD and PMT detectors are suited for signal detection in photon starved environments such as high altitude bathymetric LiDAR.

One of the drawbacks of SPAD detectors is the long recovery time. Following detection of a photon a channel must be quenched before it is ready to detect a new photon. Passively quenched detectors can have recovery times as much as 1 msec while actively quenched detectors are around 50 nsec. PMTs are much faster with recovery times <2 nsec. For a water penetrating ALB system, recovery time is an important specification for detector selection. Depending on the arrival rate of backscattered photons from the water column and the recovery time of the detector, backscatter in the water column could prevent bottom detection.

SPAD detectors can be arranged in a two-dimensional monolithic array; chips containing a 32×32 or 32×128 array of SPAD detectors are commercially available. Arrayed PMT detectors can also be designed using a micro-channel plate (MCP). These MCP-PMT detectors are offered in a 10×10 channel array by Hamamatsu Inc. In addition to single photon detection with good quantum efficiency at 532 nm, these detectors provide spatial resolution. Arrayed detectors offer advantages for high altitude ALB both in terms of increased point density and improvements in geo-location via post-processing. The fact that each pixel in the array shares the same position, attitude, and timing errors can be leveraged to develop algorithms for geo-location accuracy enhancement.

Using a single photon sensitive detector, both water penetration and high altitude operations can be achieved with existing laser technology. The number of received photons is given by the equation:

$$N_r = \frac{E_t C \cdot T(h; \lambda) A_r \rho_e}{\zeta(\lambda) h^2 \pi}$$

where $E_t$ is the energy per laser pulse, C is the efficiency of the LiDAR system, $T(h; \lambda)$ is the two-way atmospheric attenuation at the slant range h and the wavelength $\lambda$, $\xi(\lambda)$ is the energy per photon, $A_r$ is the aperture receiver area, and $\rho_e$ is the effective albedo of the seafloor after two-way attenuation by the water column. At wavelength 532 nm, $\xi(\lambda) = 3.734 \times 10^{-19}$ J. Using nominal values C=0.1, T=0.85, and $A_r$=0.015 m² and a slant range of h=3100 m the photon count is $N_r = E_t \cdot 1.13 \times 10^8 \rho_e$. The effective albedo of the seafloor is dependent on z the water depth, $\rho_b$ the actual albedo of the seafloor bottom, $K_d$ the diffuse attenuation coefficient, and $F_r$ the Fresnel reflection at the water surface, and is described by the equation $$\rho_e = \rho_b e^{(-2K_d z)}(1 - F_r).$$

For the case of a sandy bottom with reflectance $\rho_b$=0.4, a clear coastal water with $K_d$=0.1 m⁻¹, and a Fresnel reflection of $F_r$=0.03, to receive on average a single photon from a depth of z=20 m requires a laser pulse with energy $E_t \approx 1$ μJ. Although more than a single photon is needed for a high probability of detection, from Poisson statistics, as few as 3 photons is sufficient. For seafloor detection over a range of water clarity, bottom reflectance values, and LiDAR system efficiencies, energy per pulse and per channel on the order of 10 μJ is sufficient for designing a high altitude ALB system. ALB systems typically take bathymetric measurements at the rate of 10-30 kHz. After accounting for the increased measurement rate needed for high altitude operation, the total laser power is <10 W.

Another important design criterion for an ALB system is maintaining a constant off-nadir laser beam angle. There are many effective ways to achieve a constant off-nadir scan angle, including passing a nadir pointing laser beam through a rotating wedge, Fresnel prism or leveraging multiple scanning mirrors. The design of the prism can be selected once an optimal off-nadir angle is determined. The circular scan pattern that is generated from a rotating prism, or orthogonal sinusoidal scan mirrors, is also well suited to an arrayed detector. When used with an arrayed detector, contiguous mapping can be maintained at relatively low scan speeds. In addition, with a circular scan pattern objects are scanned at least twice, from different look angles, which is beneficial for certain applications such as object detection and identification. As previously mentioned the circular pattern is also leveraged for calibration and improved geo-location. Both ALB systems, such as CZMIL, and high altitude topographic LiDAR systems, such as ALIRT and Buckeye-II, use circular scan patterns.

One of the key differences between single photon detectors and waveform detectors is the processing of the data. Because a single photon is indistinguishable from noise, data from these detectors requires heavy processing. The processing is often non local and best done in the point cloud to make optimal use of the data. Data from single photon detectors contains noise from non-laser illumination sources such as solar radiance. Due to the high sensitivity of these devices, they also contain considerable amounts of system noise including cross-talk, after-pulsing, and Gaussian noise. Unlike linear mode detectors, which produce a waveform that can be analyzed to determine the leading edge or peak, a single photon cannot be accurately located within the received laser pulse without analyzing a neighborhood of points. However, with the selection of appropriate data structures and pattern recognition algorithms these noise sources can be efficiently removed and/or reduced.

Point cloud processing algorithms can also be applied to detect the water surface, filter the backscatter from the water column, and detect the seafloor returns. Unlike waveform processing which is typically performed independently for each laser pulse, point cloud algorithms integrate measurements from multiple neighboring laser pulses. For problems such as water surface detection from a green only laser system and bottom detection with sparse returns this methodology is advantageous.

In summary, by leveraging recent advances in high altitude topographic LiDAR systems, including single photon detectors, arrayed detectors, circularly scanning systems, and point cloud processing algorithms, ALB systems in accordance with the present disclosure can operate at much higher altitude than existing systems. Example embodiments of these topo-bathy LiDAR systems are capable of more efficient coverage with greater point density, and can generate both topography and bathymetry in a single pass.

Each of the following references are incorporated herein by reference in their entirety: (1) *Meeting the accuracy challenge in airborne LiDAR bathymetry*. Guenther, Gary C. 2000. Proceedings of EARSeL-SIG-Workshop LIDAR, Dresden/FRG; (2) Mobley C., et al. Ocean Optics Web Book. Ocean Optics Web Book. http://www.oceanopticsbook.info/; (3) Impact of Receiver Deadtime on Photon-Counting SLR and Altimetry during Daylight Operations. J., Degnan J. 2014. Proceedings of the 16th International Workshop on Laser Ranging; and (4) Two-Dimensional SPAD Imaging Camera for Photon Counting. Guerrieri F, Tisa S. Tosi A., Zappa F. 5, s.l.: IEEE, 2010, IEEE Photonics Journal, Vol. 2.

Details of an example optical design of a high altitude topo-bathy LiDAR system in accordance the present disclosure are provided below with reference to FIGS. 1-18. Those of ordinary skill in the art will understand that the systems and methods thereof, specifically described herein and illustrated in the accompanying drawings, are non-limiting embodiments.

Figure 2:
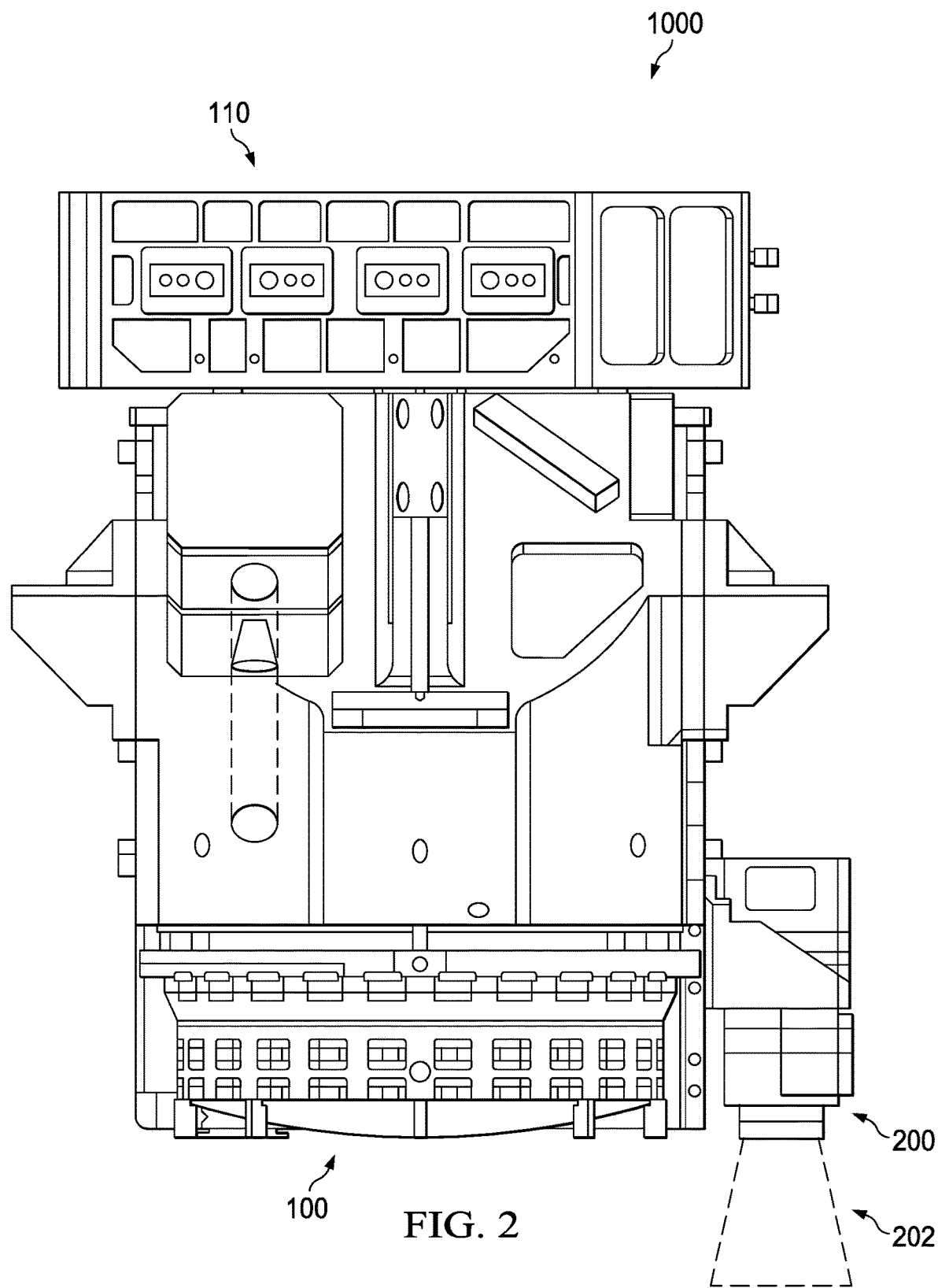
FIG. 2 is a front view of the ALB system of FIG. 1.
Figure 3:
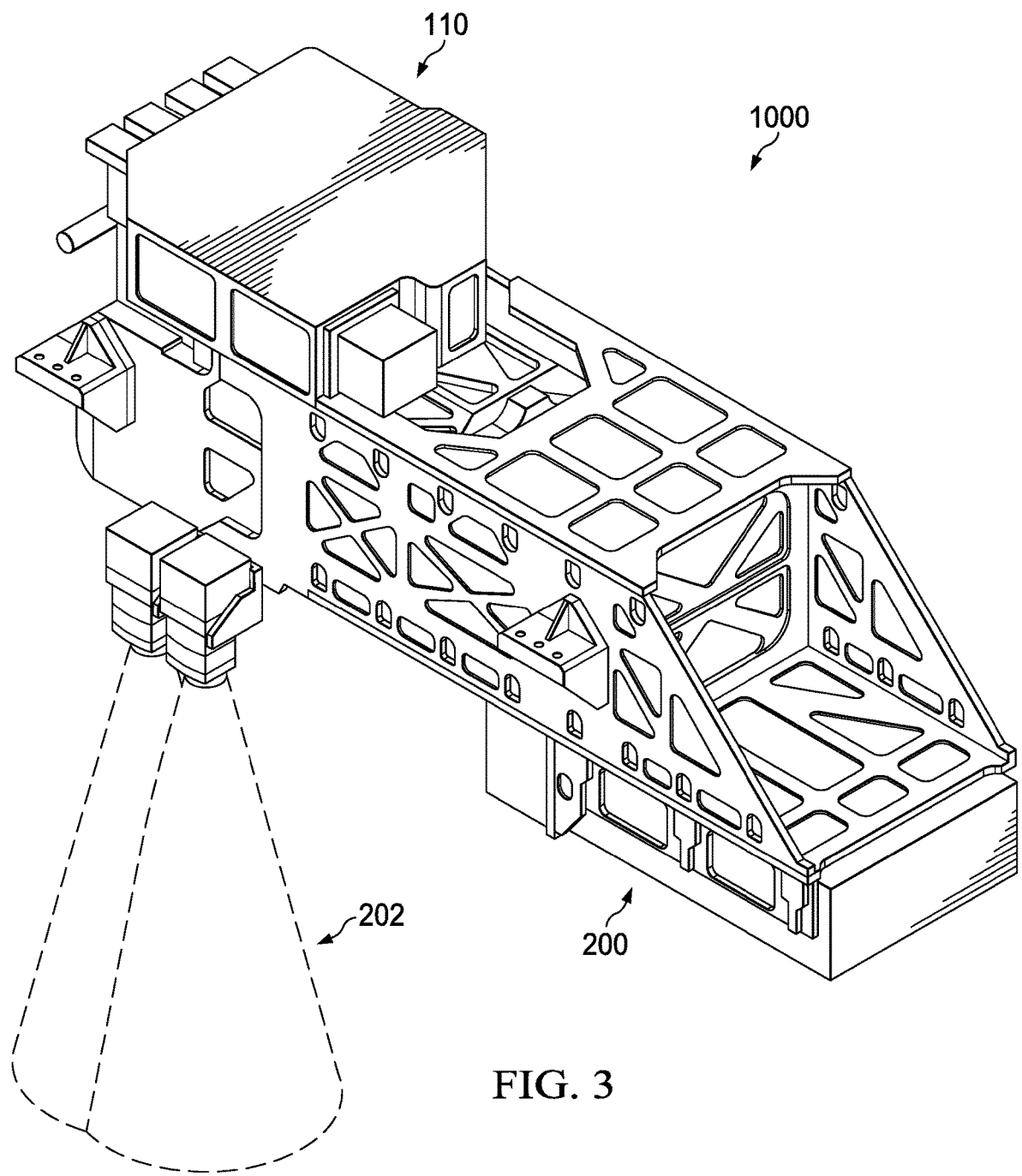
FIG. 3 is an isometric view of the ALB system of FIG. 1.
Figure 4:
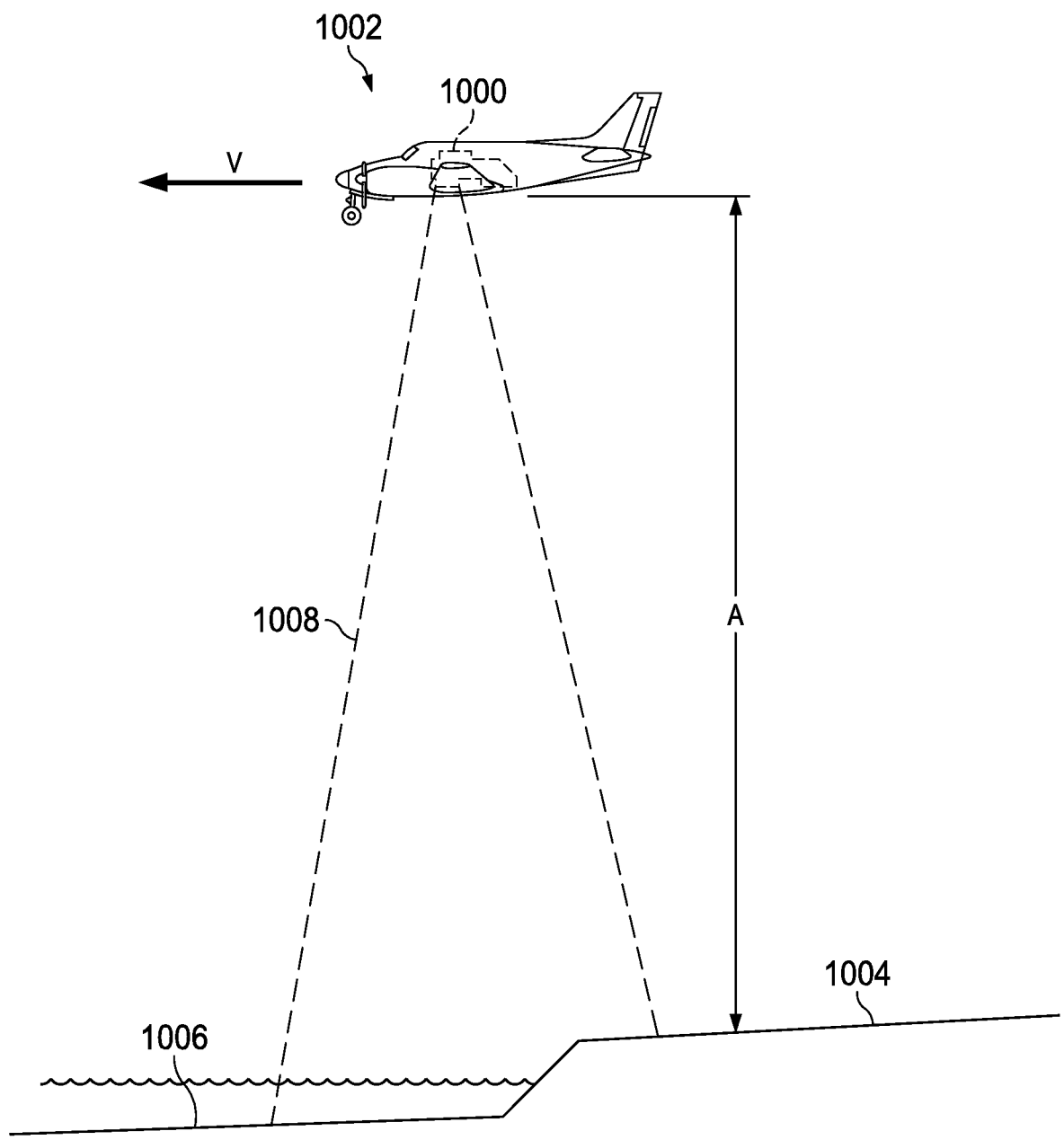
FIG. 4 schematically illustrates an example ALB system being transported by an aircraft for data collection.

Referring now to FIGS. 1-3, an example high-altitude ALB system 1000 in accordance with the present disclosure is depicted. FIG. 1 is a side view of the ALB system 1000, FIG. 2 is a front view of the ALB system 1000, and FIG. 3 is an isometric view of the ALB system 1000. The ALB system 1000 can be mounted to an aircraft to collect topographic and bathymetric data from an altitude of around 10,000 feet, for example. In some embodiments, the ALB system 1000 is mounted to a Reims-Cessna F406 Caravan II aircraft and flown at about 160 knots, but this disclosure is not so limited. In other embodiments, for example, an unmanned aerial vehicle (UAV) or other suitable aircraft can be used. FIG. 4 schematically illustrates the ALB system 1000 of FIGS. 1-3 being transported by an aircraft 1002. The aircraft 1002 can be flying at an altitude (A) of about 10,000 feet, for example, and traveling at a velocity (V) of about 160 knots, for example. As schematically indicated by data collection cone 1008, the ALB system 1000 can be used to map both topographic surfaces 1004 and underwater surfaces 1006.

The ALB system 1000 in accordance with the present disclosure can have a water depth penetration in the range of about 0 to about 30 meters depending on water clarity, with about 0 to about 10 meters of water depth penetration having approximately 1 meter spatial resolution and about 10 to about 30 meters of water depth penetration having a spatial resolution of about 2.5 meters. In accordance with various embodiments, the topographic resolution is about 0.5 meters. When flown at altitude, the ALB system 1000 can have a swath width of about 850 meters. The ALB system 1000 can include various sub-systems or components, which are described in more detail below. For example, the ALB system 1000 can include a receiver system 100, a detector system 110, and a laser transmission system 200. Generally, the laser transmission system 200 can transmit laser pulses at two different wavelengths (schematically illustrated by laser pulses 202) to illuminate an area on the ground that is aligned with the field of view of the receiver system 100.

Figure 5:
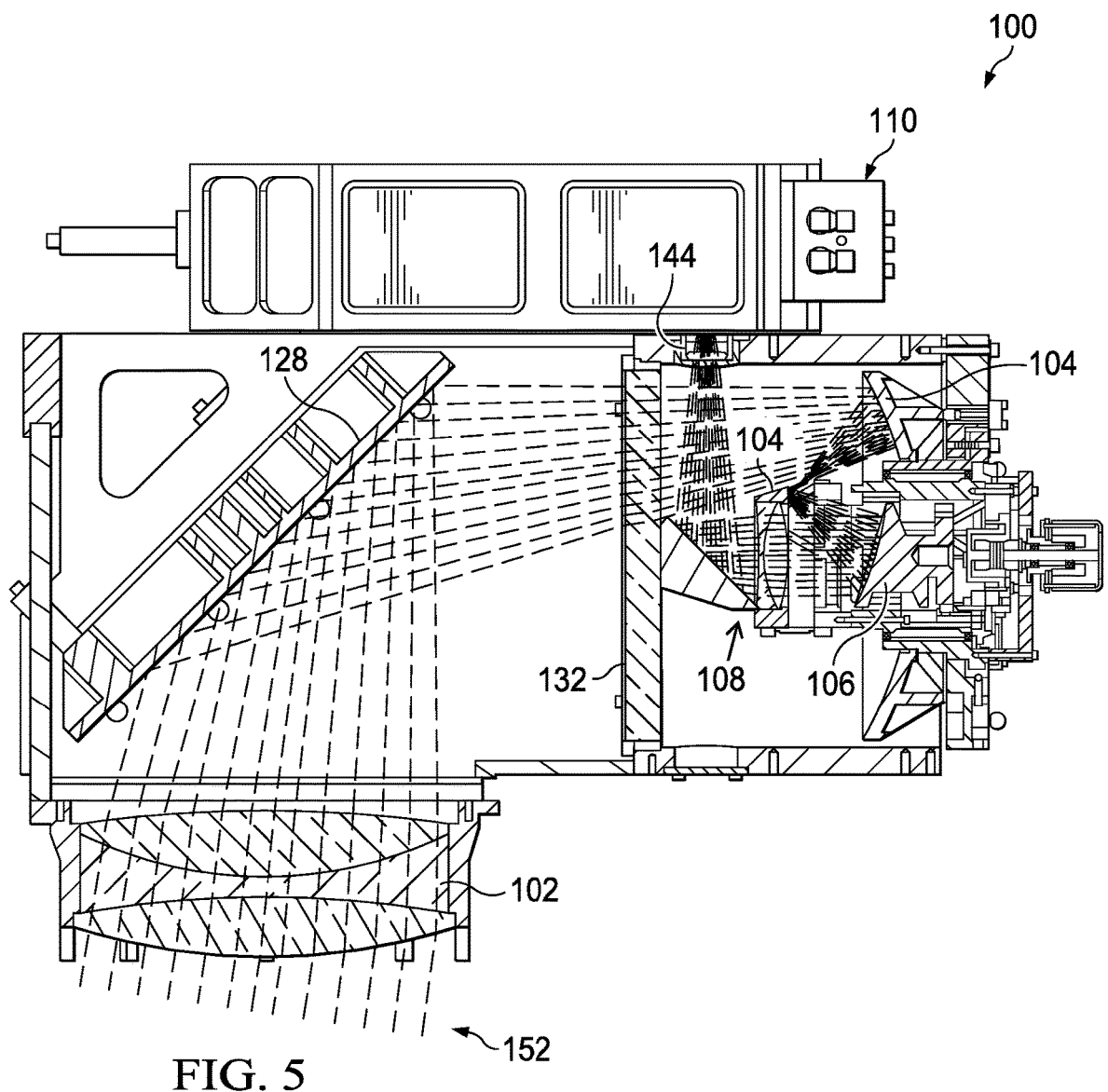
FIGS. 5-7 depict an example optical design of an example receiver system in accordance with the present disclosure.
Figure 6:
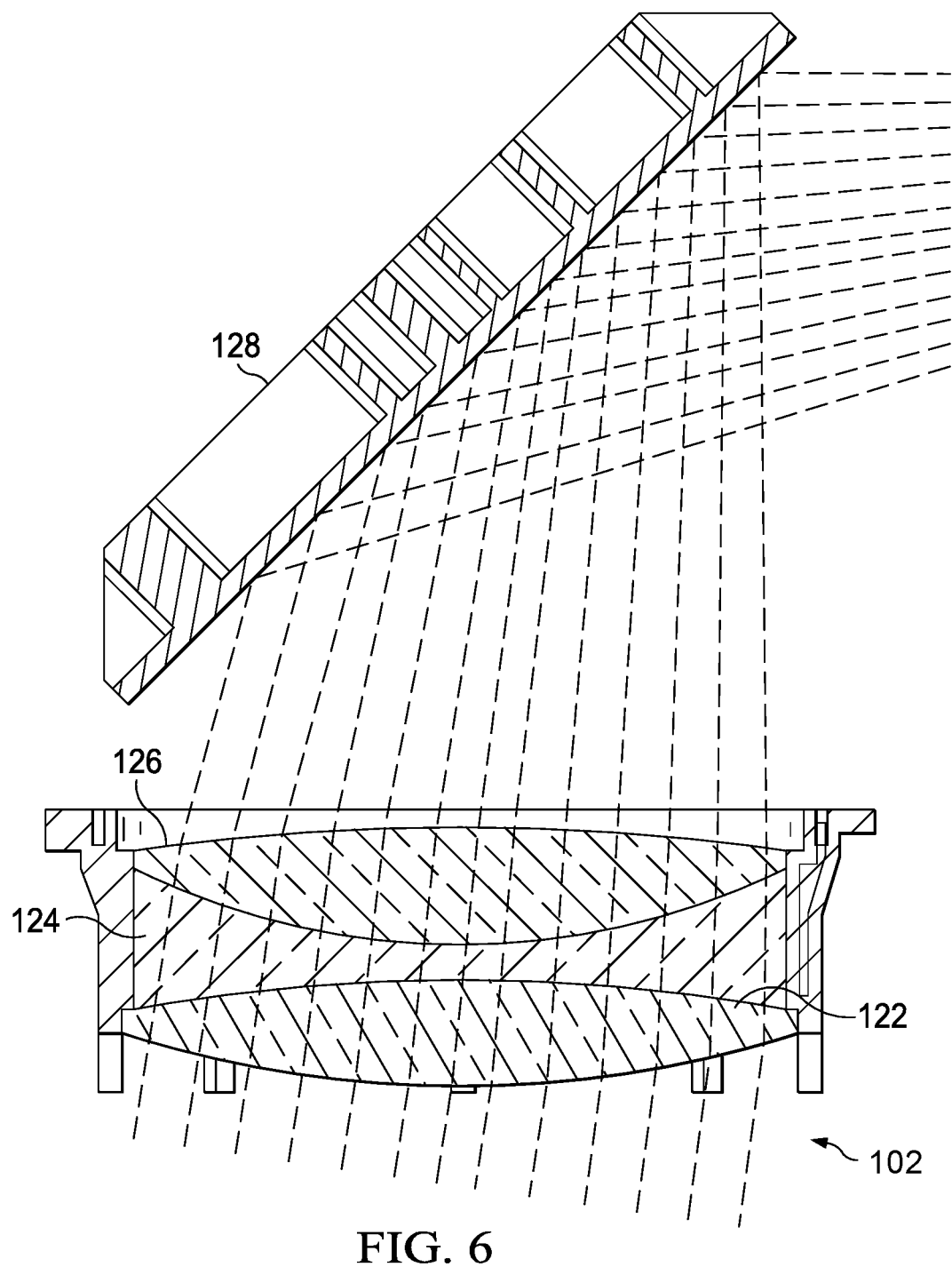
Figure 7:
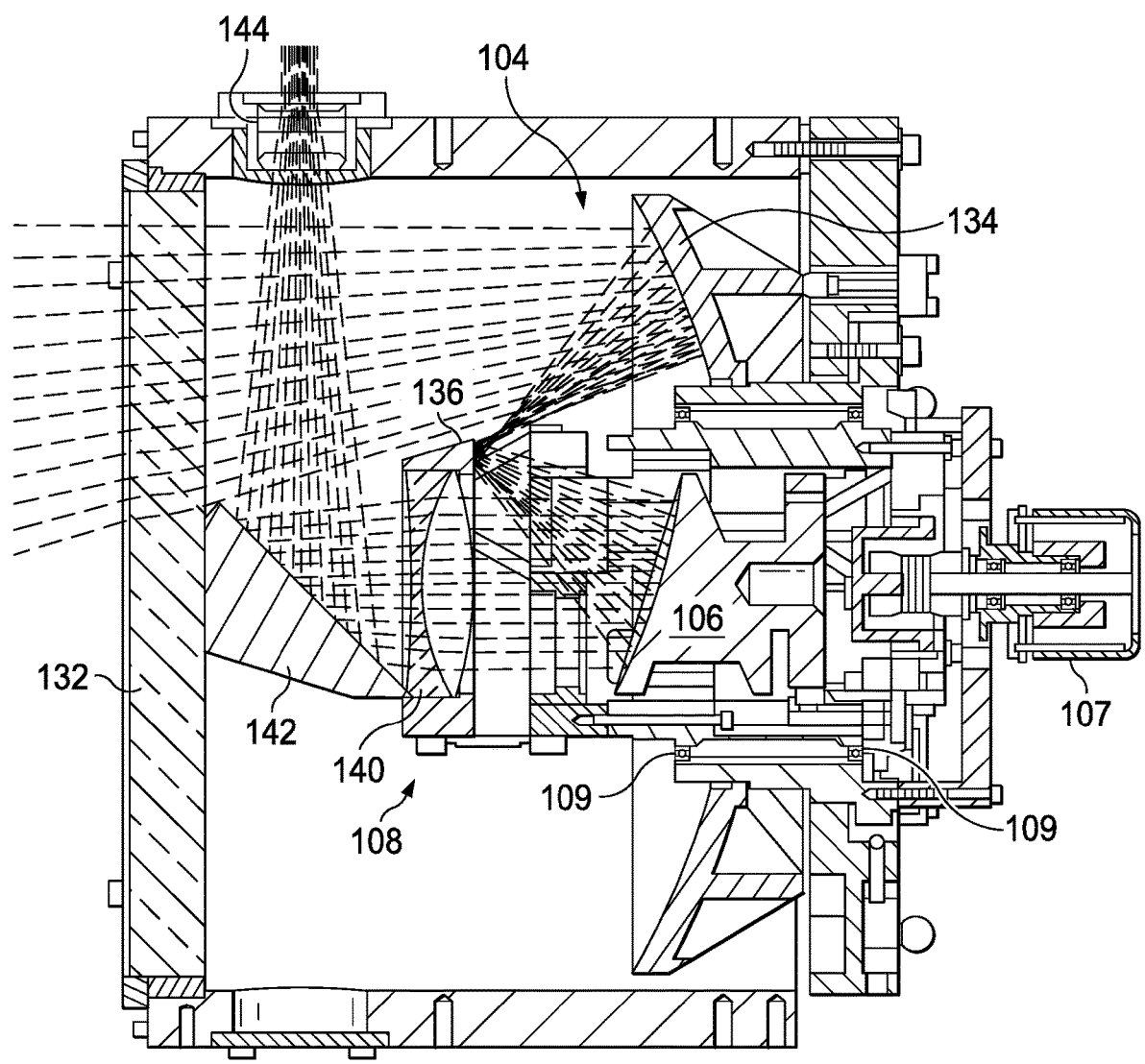
Figure 8:
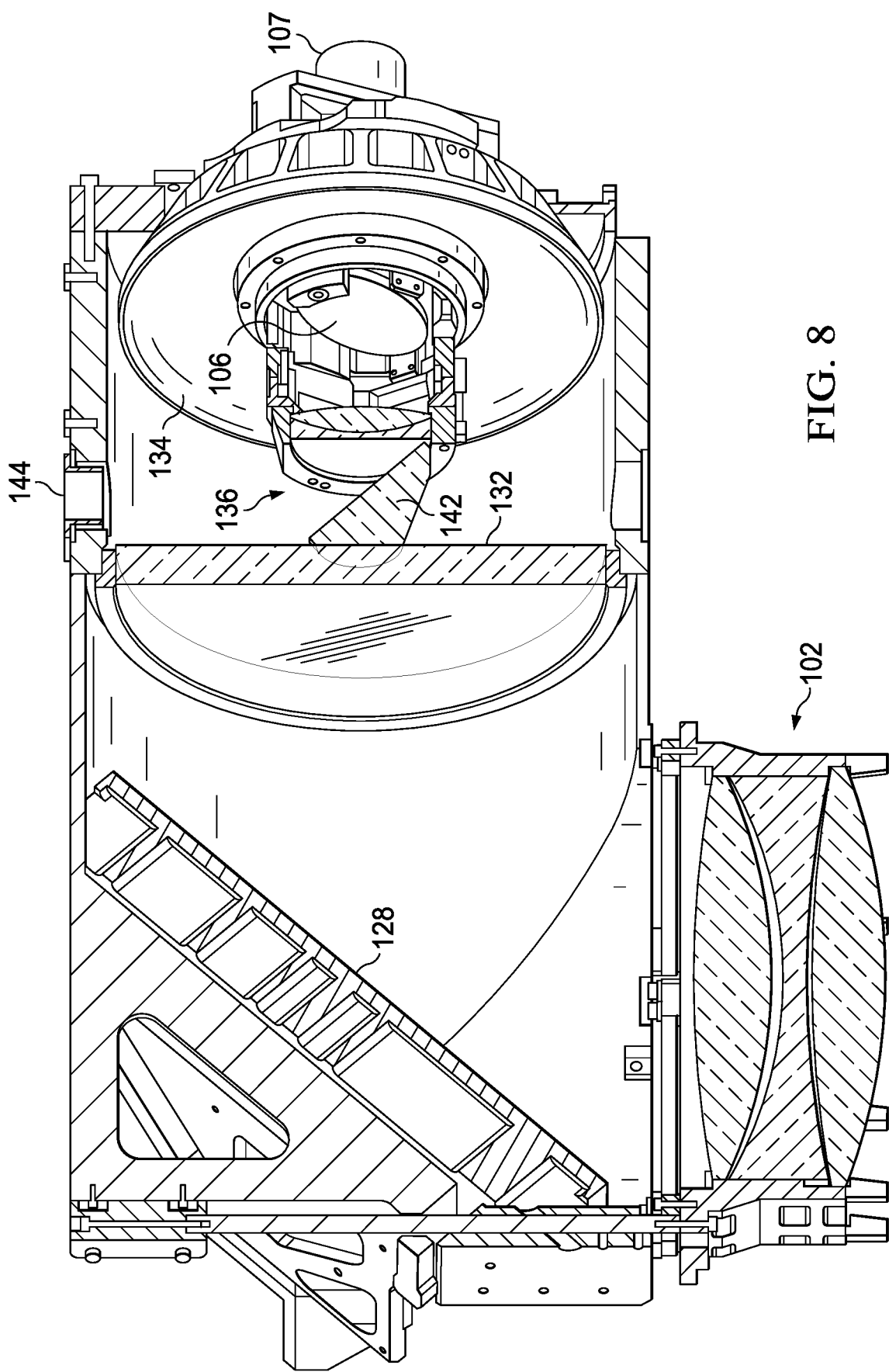
FIG. 8 depicts a cutaway isometric view of a portion of the receiver system of FIGS. 5-7.

As depicted in FIGS. 5-7, an example optical design of the receiver system 100 of the ALB system 1000 in accordance with an embodiment of the present disclosure is depicted. Furthermore, FIG. 8 depicts a cutaway isometric view of a portion of the receiver system 100 illustrated in FIGS. 5-7. Referring first to FIG. 5, the optical design can generally include an objective 102, a reflective aperture relay (RAR) 104, a down-collimating telescope 108, and a detector system 110, each of which are described in more detail below. The receiver system can also include a scanning sub-system, which can include a scanning wobble mirror 106.

The objective 102 can be designed to collect and focus returned light 152 from a point on the ground that is about 10,000 feet away and at an angle of 8 degrees off the optical axis, for example. The 8 degree off-nadir angle can be swept in a circle with the scanning wobble mirror 106 that is rotating within the receiver system 100, as shown. The RAR 104 can be positioned downstream of a spider-window 132. The purpose of the RAR 104 can be two-fold. A primary purpose for the RAR 104 is to produce an image of the aperture of the objective to the scanning wobble mirror 106.

A secondary purpose of the RAR 104 is to correct some of the optical aberrations that are produced by the objective 102. The light from the RAR 104 can be directed to the scanning wobble mirror 106. The scanning wobble mirror 106 is located on the optical axis of the receiver system 100 and is used to collect the light that is precessing at 8 degrees and return it to being parallel to the axis of the optical system. The light leaving the scanning wobble mirror 106 is mostly collimated. After the beam is collimated and redirected to be on-axis, the beam diameter can be reduced with the down-collimating telescope, described in more detail below. A fold mirror can be utilized to reflect the beam out of the main body of the telescope. The beam leaving the down-collimating telescope (DCT) 108 is mostly collimated as it enters the detector system 110. The detector system 110 can have an array of 5 detectors, for example. Each detector can operate at a single wavelength. The wavelengths are separated using dichroic beamsplitters. The energy going to the individual detectors is controlled through neutral beamsplitters. Additional description regarding the detector 110 can be found below with reference to FIGS. 10-11.

As depicted in FIG. 6, the objective 102 in the system can be composed of three glass elements 122, 124, and 126, for example. The three elements 122, 124, and 126 can provide color correction and can control the aberrations in the system to a level where the downstream optical components can be utilized to correct them. The front element 122 in the objective 102 can have one surface designed to be aspheric. The remaining elements 124 and 126 can be spherical. The aspherical surface of the front element 122 can be used to control the amount of spherical aberration in the system. The aberrations that are not well controlled through the objective can be coma and astigmatism. In accordance with various embodiments, the diameter of the collected light beam can be 300 mm and the focal length of the objective alone can be 965 mm. The f-stop of the objective can be f/3.2, for example. Minimizing the aberrations in each part of the system can allow for looser alignment tolerances between components. The two mirrors 134 and 136 in the RAR 104 can both be aspheric. The beam-path from the objective 102 can be folded with a fold mirror 128 that is flat that serves to shorten the overall length of the system. The fold mirror 128 can be considered to be part of the objective 102 in accordance with various embodiments.

As shown in FIG. 7, after the fold mirror 128, the light passes through the spider-window 132, which generally is a thick window. In some embodiments, for example, the spider-window 132 is about 30 mm thick. After the spider-window 132 is the RAR 104. The RAR 104 can include two curved mirrors, a primary mirror 134 and a secondary mirror 136, for example. The light from the objective 102 can come to a focus between the first and second mirrors 134 and 136. It can be required that the light go through focus to allow the aperture of the objective 102 to be imaged to the scanning wobble mirror 106. Imaging of the aperture of the objective 102 to the scanning wobble mirror 106 can be required to simplify the mapping of the images from the sensors to the ground.

Still referring to FIG. 7, the scanning wobble mirror 106 can have a toroidal surface that is rotated about the optical axis of the system by a motor 107. Bearings 109 can facilitate rotation of the scanning wobble mirror 106 and its assembly about the optical axis. The tilt angle of the scanning wobble mirror 106 can be, for example, 16.654 degrees with respect to the optical axis of the system. The included angle between the input and output beams at the scanning wobble mirror 106 is different from the 8 degree angle at the input of the system because of the de-magnification of the image of the objective aperture. The scanning wobble mirror 106 can be a toroidal surface with aspheric terms in one axis, for example. By only allowing aspheric terms in one axis, there exists an axis of rotational symmetry within the part. Having an axis of rotational symmetry allows for simpler manufacturing of the surface. The beam of light leaving the scanning wobble mirror 106 is parallel to the optical axis of the system and is also mostly collimated.

The DCT 108 (FIG. 8) can have a positive doublet 140, a fold mirror 142 attached to the spider window 132, and a negative air-spaced triplet 144. The first positive doublet 140 begins to focus the beam after the scanning wobble mirror 106. The focusing is required to reduce the size of the fold mirror 142 in the system that sends the light out to the detector system 110. The fold mirror 142 needs to be small enough to fit into the center of the annulus that is formed by the light beam as it is scanned in a circle. The fold mirror 142 can be mounted to the spider window 132. A window is used to replace a telescope's mechanical spider to prevent the spider from occluding any of the signal as the system is scanned. The beam that enters the DCT 108 can be 82.5 mm in diameter and can be 20 mm when it exits the DCT 108. The fold mirror 142 can enable the beam to be directed away from the body of the main system so that the detector assembly does not block the incoming beam.

Figure 9:
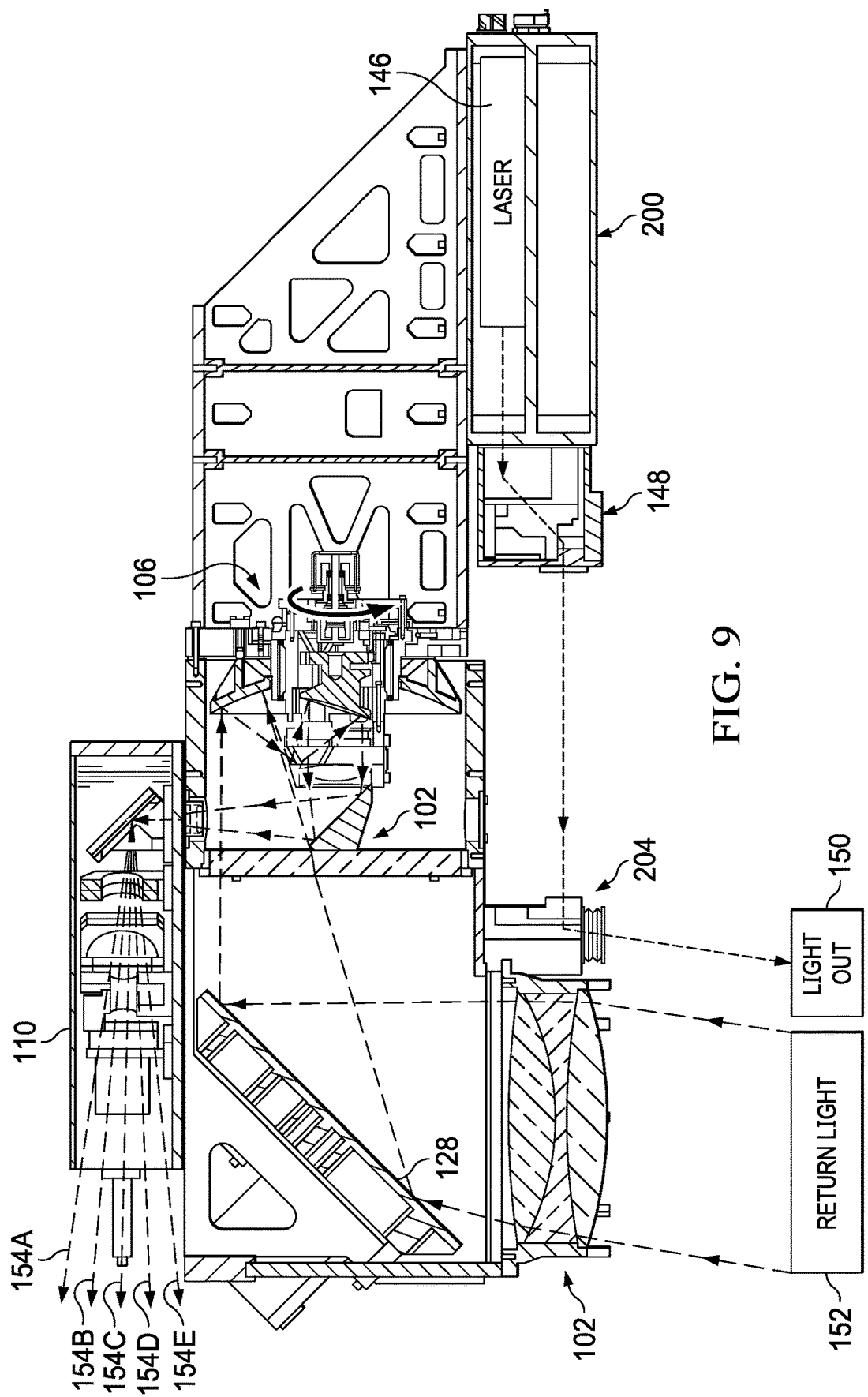
FIG. 9 depicts example optical paths through the example ALB system of FIG. 1.

Referring now to FIG. 9, example light paths through the receiver system 100 are schematically illustrated. As shown, a laser 146 of a laser transmissions system 200 generates a beam of light that is routed through a transmitter module 148 that contains beam conditioning optics. The laser light can be routed through a baffle (shown in FIG. 1) and ultimately directed downward, as indicated by light out 150. Additional detail regarding the laser transmission system 200 can be found below with reference to FIGS. 15-18. As shown in FIG. 9, the return light 152 can be initially received by the objective 102 and directed to the fold mirror 128 and eventually to the scanning wobble mirror 106, as described in detail above with reference to FIGS. 5-7. The return light 152 is ultimately received by the detector system 110, as described in more detail below. The detector system 110 can generally detect various channels in the return light 152, and can include a Raman channel 154A (647 nm); deep green 154B (532 nm); shallow green 154C (532 nm); IR/topo 154D (1064 nm); and IR Safety 154E (1064 nm).

Figure 10:
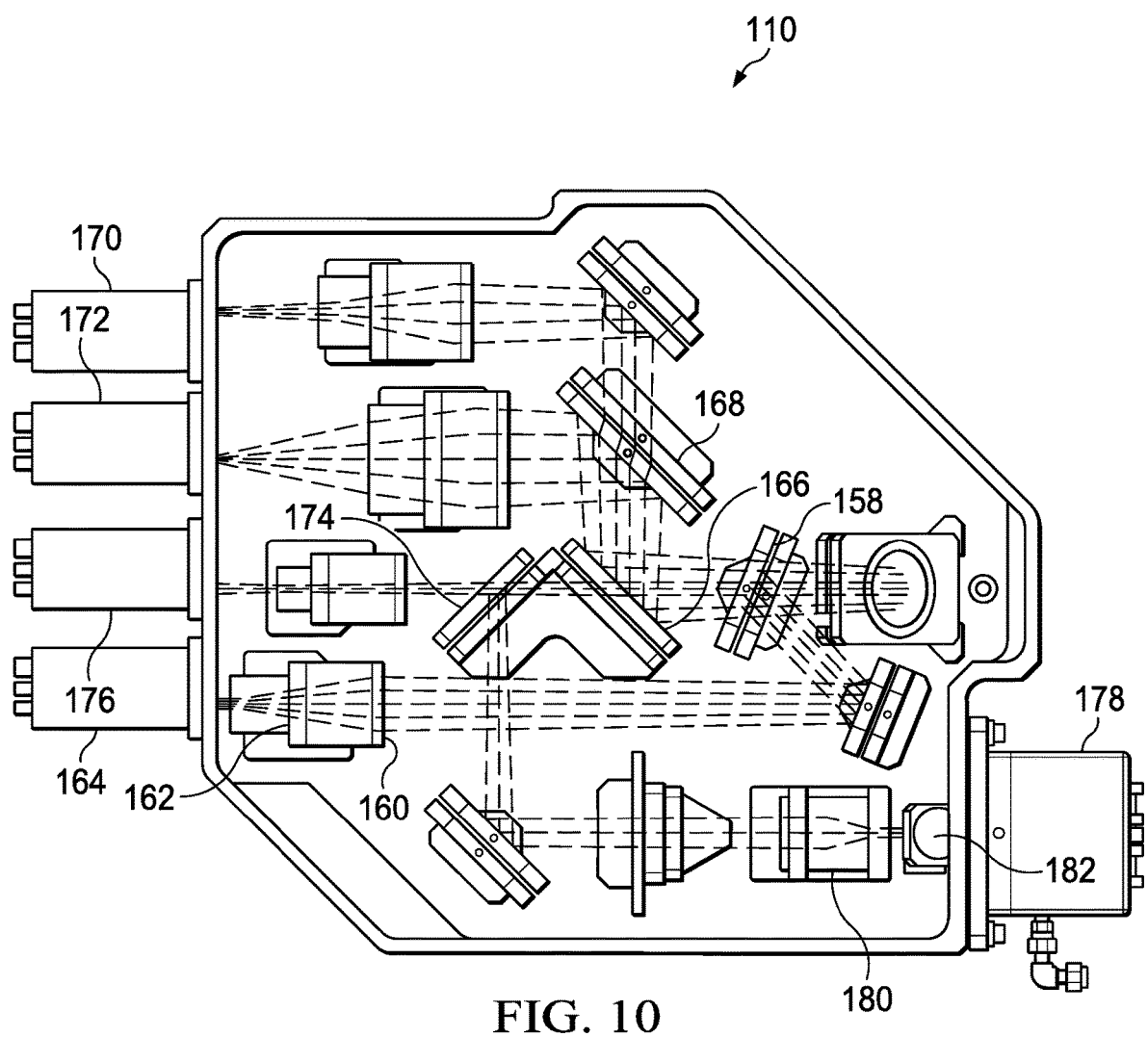
FIG. 10 depicts an example detector system in accordance with one non-limiting embodiment.
Figure 11:
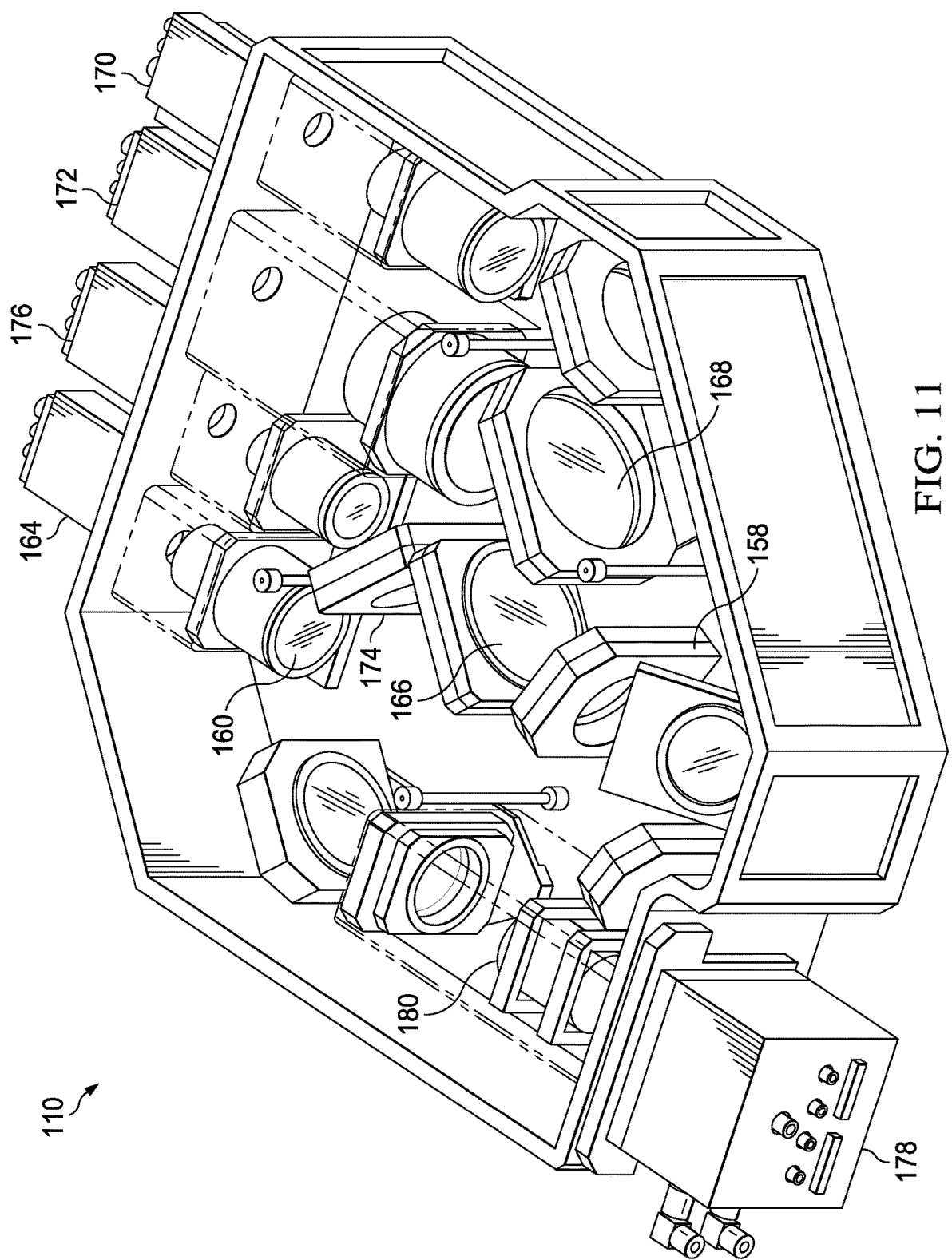
FIG. 11 depicts an isometric view of the detector system of FIG. 10 with components removed for clarity.

Referring now to FIGS. 10-11, the detector system 110 in accordance with an example embodiment is illustrated, with FIG. 11 depicting an isometric view of the detector system 110 with components removed for clarity. In some embodiments, the detector system 110 can have five individual detectors. Once the light reaches the detector system, the individual wavelengths are separated and sent to detectors that have different functions. In accordance with the illustrated example embodiment, a first wavelength that is split off is the 647 nm band that is intended to capture Raman emission. A dichroic beamsplitter 158 that serves to split off this wavelength band can have an angle of incidence of 22.5 degrees. The lower angle of incidence can make it easier for the coating design to not be polarization sensitive. The Raman light can be split off first to reduce the number of elements that are used in that beam path, thereby reducing the transmission losses in that beam path. In the example embodiment there is a band pass filter 160 and a focusing lens 162 before a Raman detector 164. In the illustrated embodiment, the focusing lens 162 is a telephoto lens to reduce the size of the system.

In accordance with the illustrated example embodiment, the second wavelength to be split off is the 532 nm band by a long-pass dichroic beamsplitter 166. The 532 nm light is split into two channels by a partial reflector beam splitter 168 to be collected by two detectors. As shown, a shallow green detector 170 can be a quadrant detector with a lens array over the four detectors to improve their collection efficiency. Additionally, there is a deep green detector 172 which can be a single detector, in the illustrated embodiment. Both detectors can have a band pass filter and a focusing lens in front of the detector.

The final wavelength is 1064 nm. There are two paths for this wavelength, which is split by a partial reflector beam splitter 174. The first path is the IR-safety detector. The IR-safety path can have a band pass filter and a telephoto lens in front of a single detector 176. The second path can go to a 32×128 pixel Geiger-mode avalanche photodiode (GmAPD) 178. In this path there can be a focusing lens 180 that produces an image that would cover a 64×64 pixel image array. The initial image can then be re-formatted to the 32×128 pixel Geiger mode array by a GmAPD reformatting system (referred to here as reformatter 182).

Figure 12:
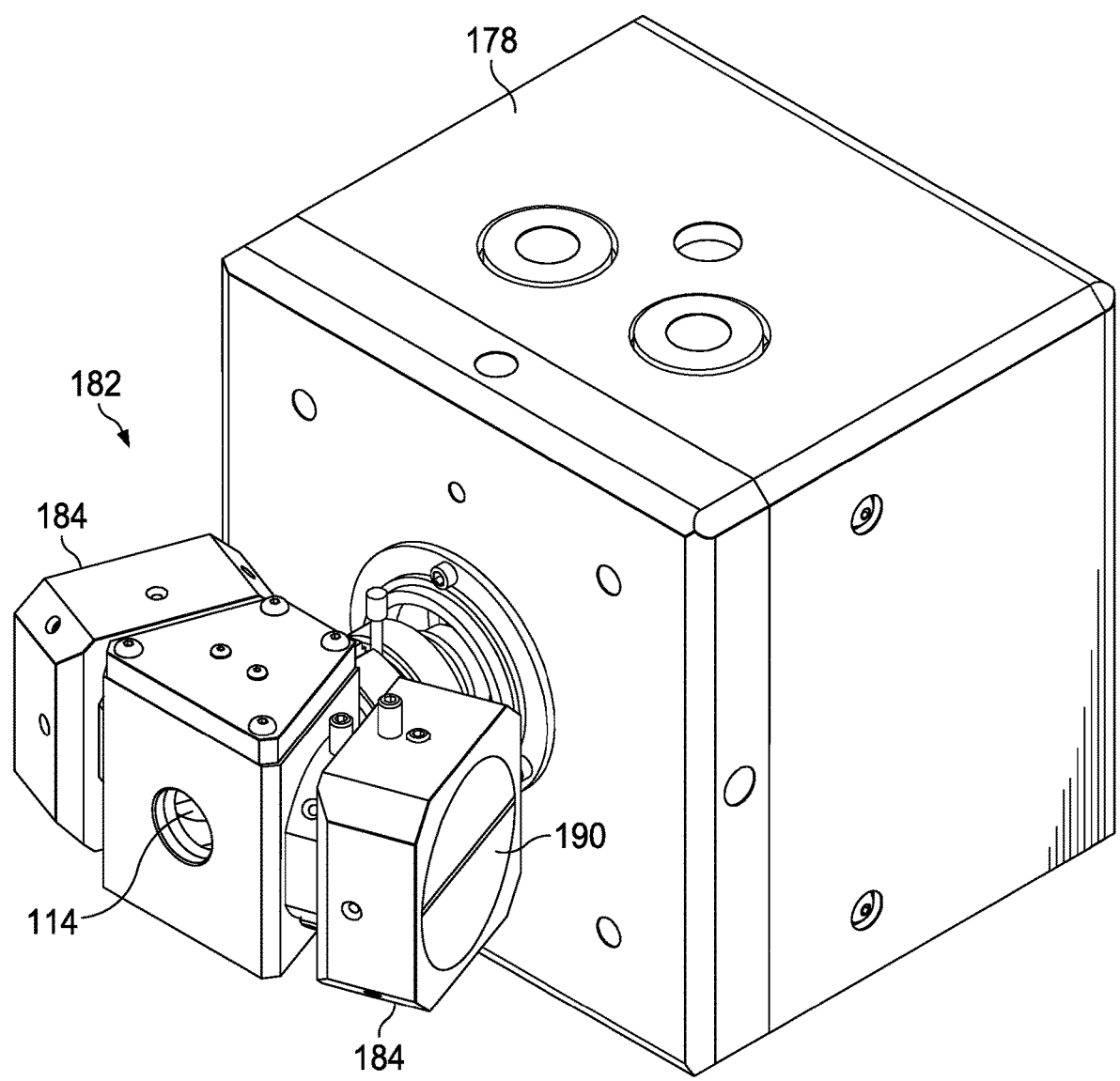
FIG. 12 depicts an examiner reformatter coupled to a Geiger mode array detector.
Figure 13:
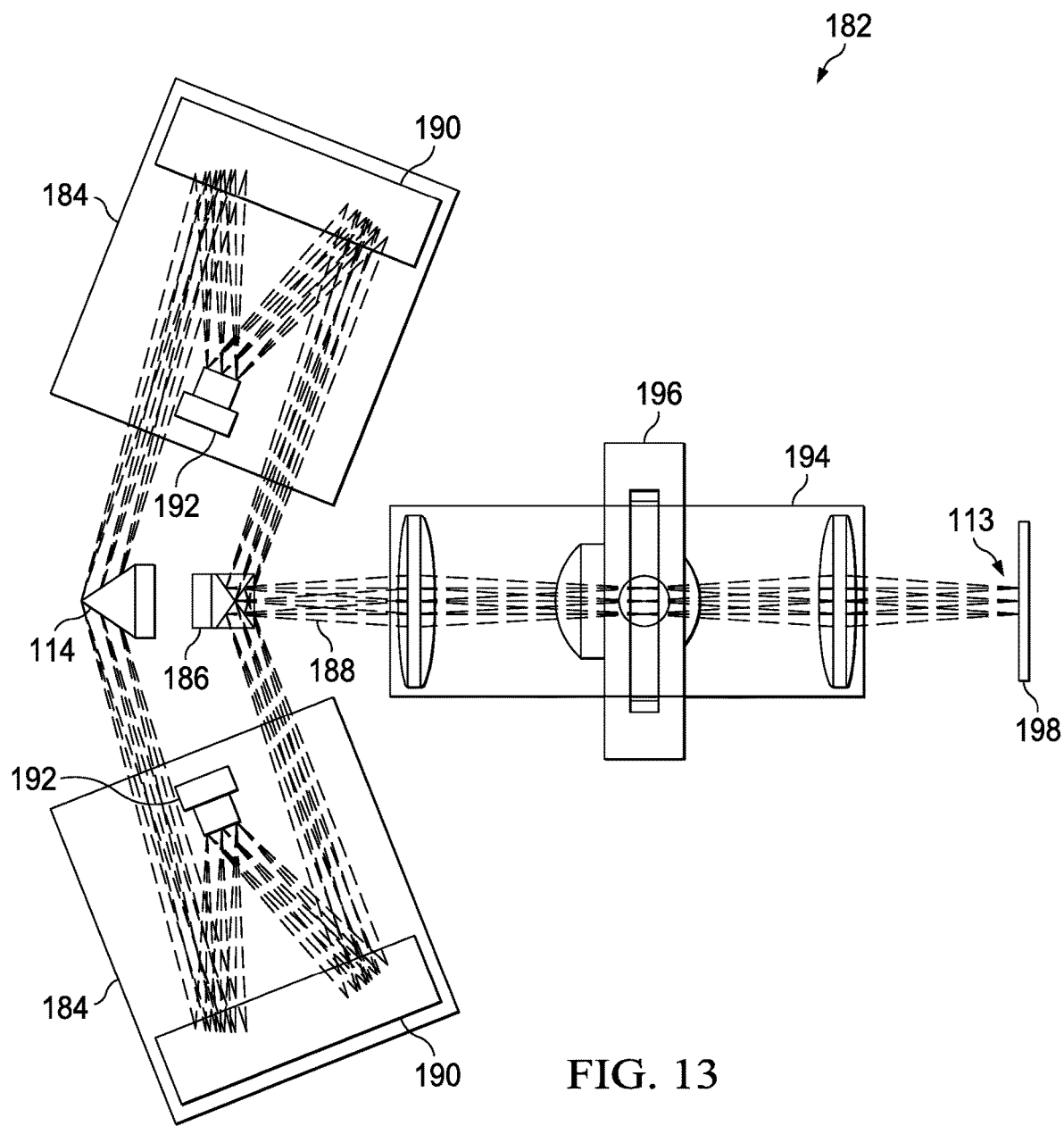
FIG. 13 schematically illustrates the optical path of the reformatter of FIG. 12.

Referring now to FIGS. 12-13, a reformatter 182 is illustrated, with FIG. 12 showing an isometric view of the reformatter 182 coupled to the Geiger mode array detector 178 and FIG. 13 schematically illustrates the optical path of the reformatter 182. As shown, the reformatter 182 can generally be a small system that attaches to the front of the GmAPD 178. The purpose of the reformatter 182 is to take an image that is 3.2 mm square (or other square image) and image it to an array that is 1.6 mm×6.4 mm (or other rectangular array). The imaging is intended to maintain the pixel resolution of the image by imaging the left half of the image plane (1.6 mm×3.2 mm) to the top of an GmAPD array of the Geiger mode array detector 178 and the right half of the image plane (1.6 mm×3.2 mm) to the bottom half of an GmAPD array of the Geiger mode array detector 178. The image reformatting is produced with a series of mirrors, as described below and schematically illustrated in FIG. 13.

In some implementations, the GmAPD array can be a rectangular array that is 32 pixels wide and 128 pixels high. The pixels can be 50 microns square and have an angular acceptance of ~3.5 degrees. The cone-angle can be considered to be the half-angle of the cone. The dimensions of the 4096 pixel array are 1.6 mm×64 mm. The GmAPD can be a Geiger-mode imaging device, for example, and being a Geiger-mode device, the GmAPD pixels are sensitive to single-photon events.

The receiver system 100 (FIG. 5) in accordance with the present disclosure can produce a round image. The cone-angle of the beam entering the GmAPD would be ~7 degrees if it were to be imaged onto an inscribed 32×32 pixel area. This overfilling of the pixel acceptance angle is expected to cause a 75% light loss at the GmAPD if the full aperture of the system is imaged to the camera. If the image were to be magnified to a 64×64 pixel area, the cone-angle of the beam would become ~3.5 degrees. In this case, the center 32×64 pixels would not see any light loss due to overfilling of the acceptance angle. The image would, however, only cover half of the desired field of view of the system. Increasing the number of pixels that are covered by the image causes the image that would land on one of the 32×32 pixels to be spread over four times as many pixels, which reduces the intensity at each pixel by a factor of four. These two effects appear to counteract. What actually occurs, however, is that the sensitivity of the system is increased by a factor of four. The increased sensitivity is achieved because in the 32×32 pixel configuration there is a maximum of 1024 single-photon events that can be recorded as opposed to 4096 single-photon events that can be captured with a 64×64 pixel configuration. The drawback of going to the 64×64 pixel configuration is that the array is 32×128 pixels. While the number of pixels available is 4096, they are in a rectangular configuration instead of a square configuration.

The DCT 108 (FIG. 5) and the lens system of the GmAPD 178 can be designed to produce an image where the performance is defined by >90% of the ensquared energy from a point on the ground that will fall within an area that corresponds to a 0.5 m square in the object plane. For the 32×32 pixel image, that corresponds to a 4×4 pixel array that is 100 microns on a side. For the 64×64 pixel image, that corresponds to an 8×8 pixel array. The optical performance of the system can meet this requirement over 90% of the 1.8 mrad field-of-view (FOV) while using the full aperture of the system. In some embodiments, there may be a desire to improve the resolution of the images taken with the GmAPD camera to 0.25 m. The improved resolution can be achieved by decreasing the diameter of the collection aperture of the system to 60% of the full aperture diameter. It is important to put any adjustable aperture in the system in a location that where there is an imaging of the system pupil. Placing a system stop in a location where collimated light from all field angles do not overlap will cause the illumination to be non-uniform over the FOV and will also not create the desired improved resolution at the edge of the field.

Generally, a reformatter 182 in accordance with the present disclosure is an imaging device that images a 1×2 rectangle that is one half of a 2×2 square image to one half of a rectangular 1×4 rectangular array and the other half of the square image to the second half of a 1×4 rectangular array. Beneficially, imaging can be performed without distorting the apparent aspect ratio of the square pixels from the image plane to the sensor array and without changing the cone-angle from the image to the array. By using a reformatter 182 in accordance with the present disclosure, an apparent 64×64 pixel image can be imaged to the available 32×128 pixel area of the sensor. A reformatter 182 as described herein can therefore allow the presently disclosed system to be operated at full aperture, producing a 3.2 mm×3.2 mm image with a cone angle of ~3.5 degrees. This square image can then be imaged to the 1.6 mm×6.4 mm array. Within the reformatter 182 there can be a plane where a system stop can be centered on an image of the system. The plane where the system aperture is imaged can have a variable iris. A purpose of this iris is to allow for the reduction of light to the GmAPD 178 and also to allow for the increase in resolution of the system, as described above.

Figure 14:
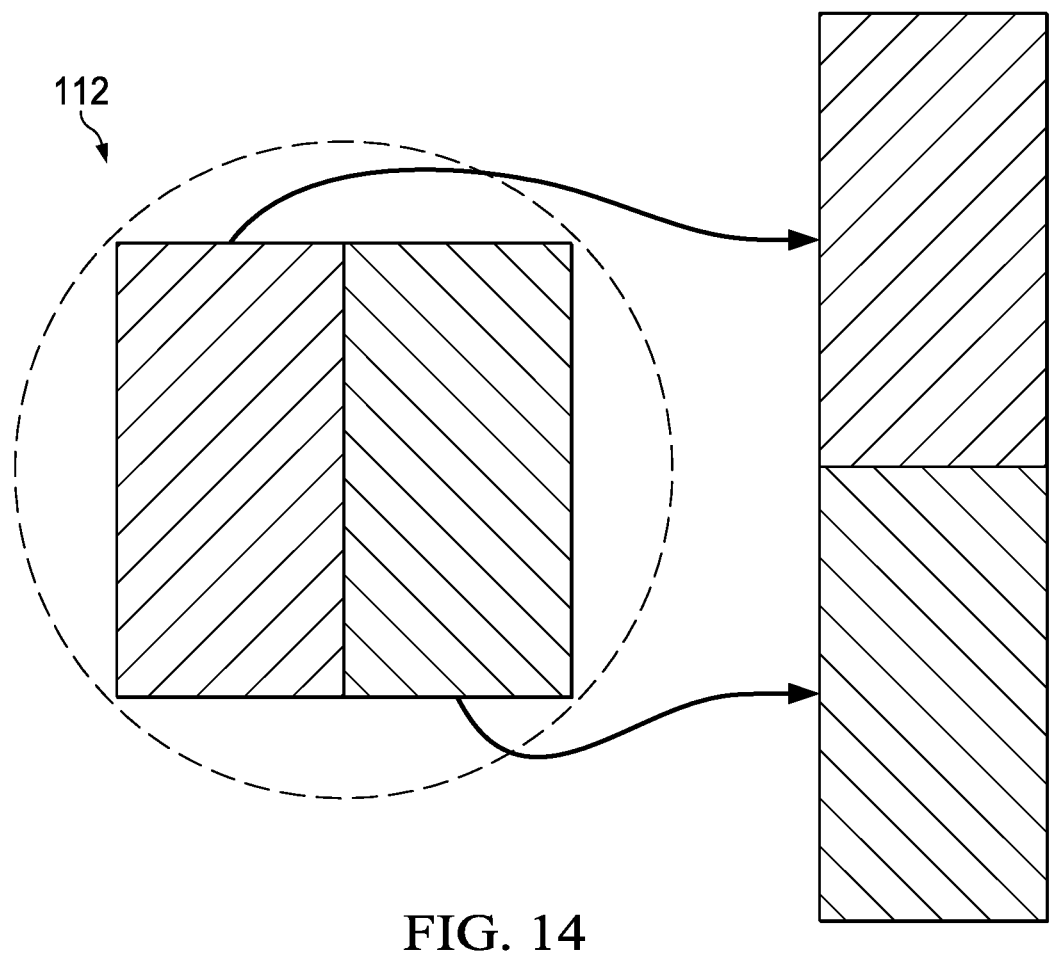
FIG. 14 depicts the conversion of a 2×2 input image to a rectangular 1×4 output image by a reformatter in accordance with one embodiment.

Referring now to FIG. 13, an example optical path of the reformatter 182 will be described. As provided above, the reformatter 182 can take a square 2×2 input image received at from the DCT 108 (FIG. 7) at the splitter mirror 114 and convert it to a rectangular 1×4 output image 113 that has the same area as the input image (an example conversation is schematically illustrated in FIG. 14).

As is to be appreciated, most optical systems produce a round image. The round image can either be inscribed within a sensor 198 or circumscribed around the sensor 198. For a rectangular sensor 198 that is 1×4, the unused area of the sensor 198 for a circular image that is inscribed so that it is completely captured by the sensor is approximately 95%. For a rectangular sensor 198 that is 1×4, the unused area of the image for a circular image that is circumscribed so that the sensor is completely covered by the image is approximately 70%. For a square sensor 198 that is 2×2, the unused area of the sensor 198 for a circular image that is inscribed so that it is completely captured by the sensor is approximately 21%. For a square sensor 198 that is 2×2, the unused area of the image for a circular image that is circumscribed so that the sensor 198 is completely covered by the image is approximately 36%. By using a reformatter 182, for the inscribed image on the sensor 198, a 16× improvement in the number of utilized pixels is realized when the sensor is effectively 2×2 vs. 1×4.

The input image of the reformatter 182 can be created by any image producing lens system. In the preferred embodiment, the cones of light that are forming the input image are parallel to the optical axis of the system (telecentric). The input image can be formed at a splitting mirror 114. The splitting mirror 114 is a mirror that can be shaped like a roof such that half of the image is reflected in one direction and half of the image is reflected in the opposite direction. In some embodiments, the "peak" of the roof can be sharp to reduce the amount of the image area that is lost when the image is split. In one example embodiment, the peak angle of the splitting mirror is about 70 degrees. The two halves of the image can be re-imaged by a pair of imagers 184 to a pair of combining mirrors 186 that are offset from each other in the axis perpendicular to the axis in which the image was split. In some embodiments, the imagers 184 are all-reflective and preferably operate at a magnification of 1:1. When the magnification of the imagers 184 is 1:1, an Offner Triplet design can be utilized. As illustrated in FIG. 13, an Offner Triplet consists of a single larger concave mirror 190 and a smaller convex mirror 192. Both mirrors 190 and 192 can be on the same axis. The axis of the mirrors 190 and 192 can be parallel and offset from the axis of the image that is being directed by the splitting mirror 114. The offset of the mirror axis can be approximately equal to one half the image height in the axis perpendicular to the axis in which the image was split. The larger concave mirror 190 can have its radius of curvature approximately equal to the distance from the entrance image to the vertex of the concave mirror. The smaller convex mirror 192 can have a radius approximately equal to half of the radius of curvature of the larger concave mirror 190. The vertex spacing between the larger concave mirror 190 and the smaller convex mirror 192 is also approximately equal to half the radius of curvature of the larger concave mirror 190. The diverging light from the image splitting prism reflects from the larger concave mirror 190 to the smaller convex mirror 192 of each imager 184. The light is then reflected from the smaller convex mirror 192 back to the larger concave mirror 190. The second reflection from the larger concave mirror 190 creates an intermediate image 188 of the split input image that is offset symmetrically from the split input image about the mirror axis. The 2×2 input image can be split into two 1×2 images by the splitting mirror 114. The two 1×2 intermediate images 188 that are produced by the two imagers 184 at the combining mirrors 186 can combine to make a 1×4 image. The combining mirrors 186 can each be angled in opposite directions by an angle that will direct the two images such that they are substantially parallel to a common optical axis. A relay imager 194 can be along the optical axis, which images the 1×4 combined intermediate images to the 1×4 sensor 198. In the illustrated example embodiment, the relay imager 194 is a pair of symmetrical lenses with adjustable aperture 196 between the second and the third lens. A purpose of the adjustable aperture 196 is to control the effective f-stop of the system. By controlling the f-stop, the amount of light that is collected by the system can be controlled. The effective f-stop can also be used to control the resolution of the system. When the input image is produced by an optical system that produces aberrations, it is common that these aberrations can be ameliorated by using an aperture 196 to cut out the more aberrated light that passes through the outer portions of the pupil.

Figure 17:
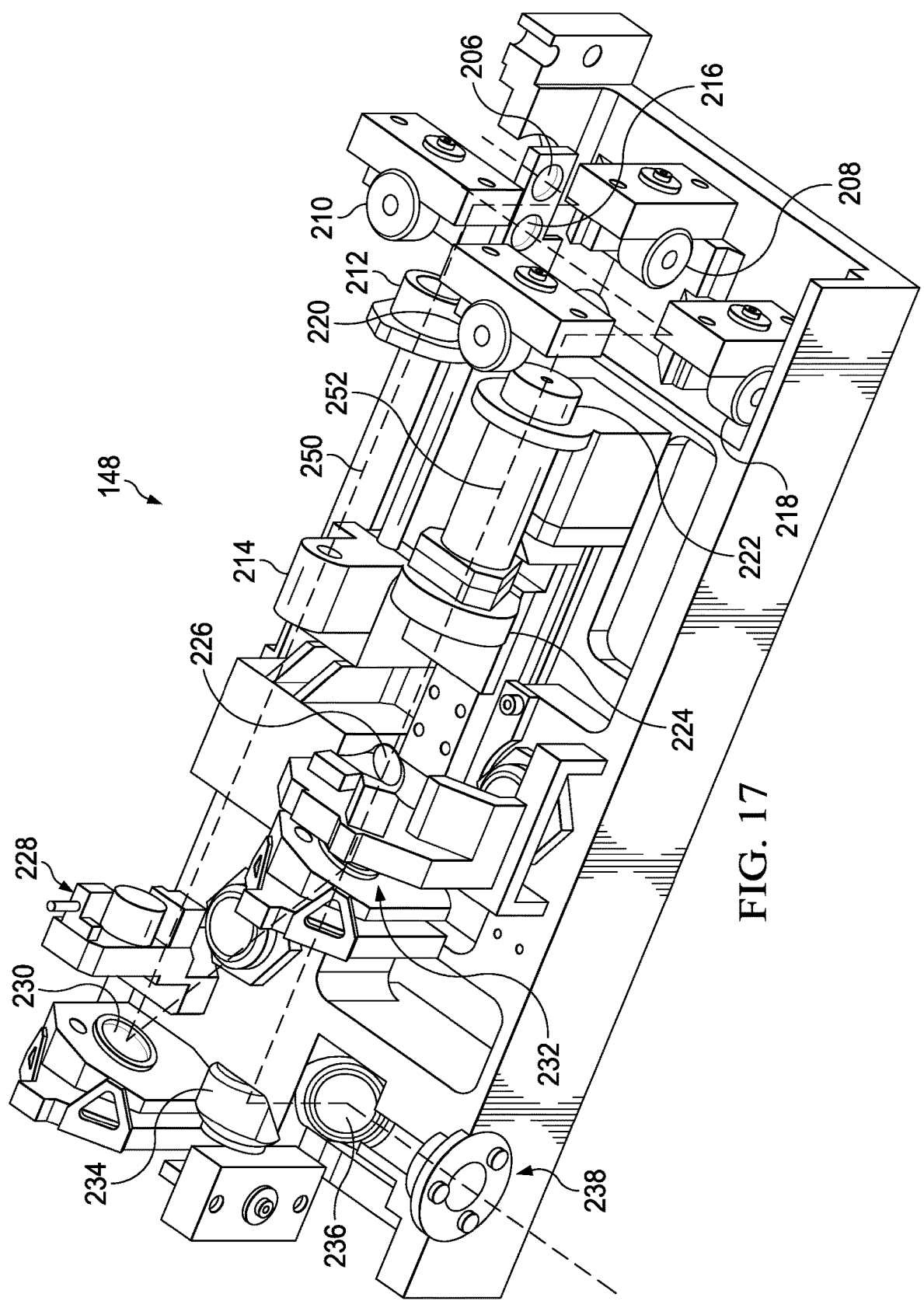
FIG. 17 is an isometric view of a laser transmitter module in accordance with one non-limiting embodiment.
Figure 18:
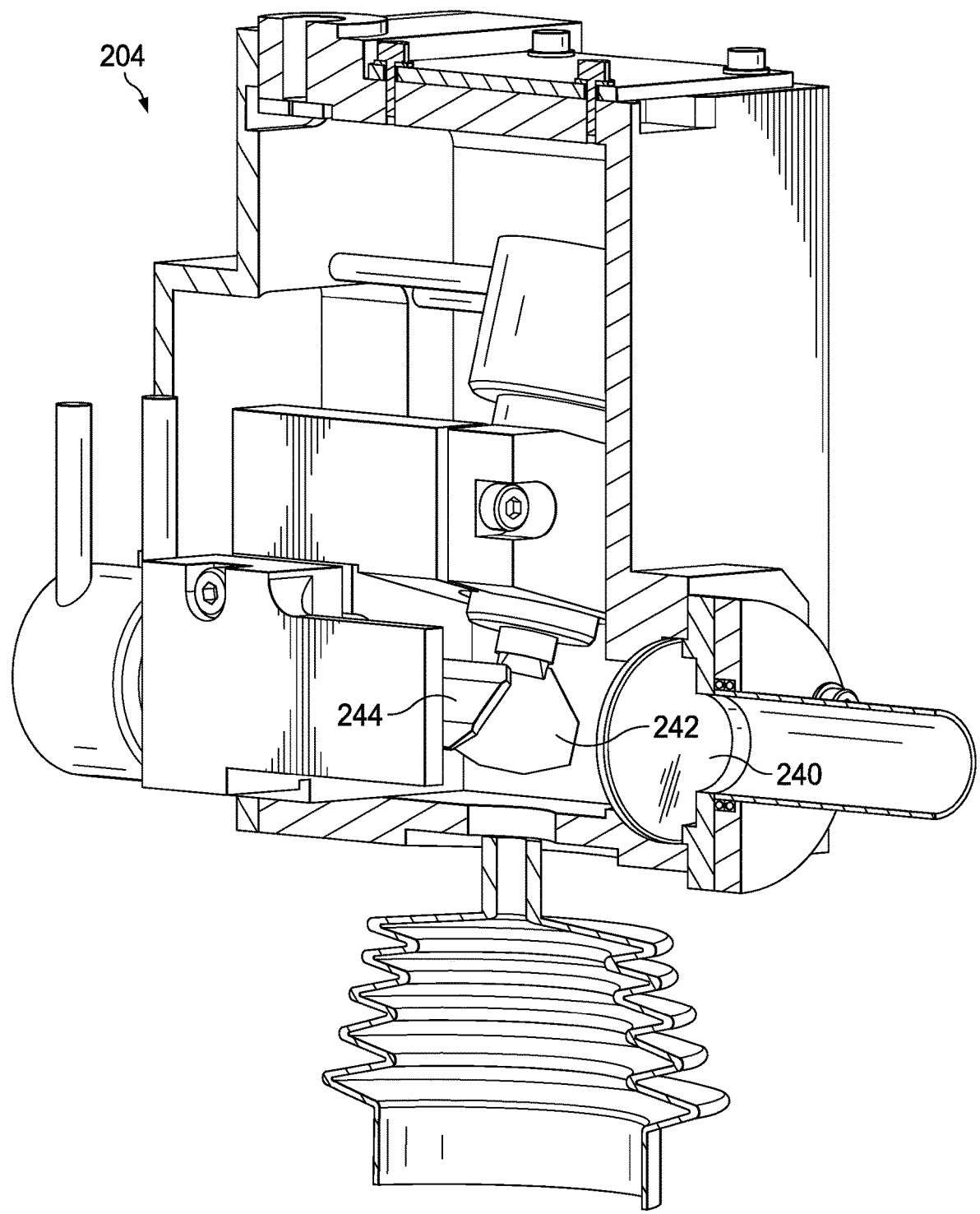
FIG. 18 is a cross-sectional isometric view of a galvo enclosure in accordance with one non-limiting embodiment.

Referring now to FIGS. 15-18, the laser transmission system 200 in accordance with various non-limiting embodiments is depicted. The laser transmission system 200 can include, for example, a laser 146, a laser transmitter module 148, and a galvo enclosure 204 which houses a pair of galvanometer driven mirrors. FIG. 15 is a side view of the laser transmission system 200, FIG. 16 is a top view of the laser transmission system 200, FIG. 17 is an isometric view of the laser transmitter module 148 in accordance with various embodiments with portions removed for clarity, and FIG. 18 is a cross-sectional isometric view of the galvo enclosure 204 in accordance with various embodiments with portions removed for clarity.

A purpose of the laser transmission system 200 in accordance with the present disclosure is to send out laser pulses 202 (FIGS. 1-3) to illuminate an area on the ground that is aligned to the area that is being viewed by the receiving system 100, as described above. The laser 146 of the laser transmission system 200 can emit light at two different wavelengths. The laser transmitter module 148 can condition the two output beams of the laser 146 prior to combining them into a two color beam with specified divergence for each color.

In accordance with various embodiments, the two wavelengths emitted by the laser 146 can be 532 nm and 1064 nm. The pulse widths of the laser pulses can be about 1.1 ns and the pulse frequency can be about 20 kHz, for example. The beams can be emitted from the laser 146 from two separate exit windows. The beams at the exit windows can have a top-hat spatial profile (sometimes call a flat-top beam) that are between about 3.3 mm and about 5 mm in diameter. The two exit windows can be separated laterally. A purpose of the optics of the laser transmission system 200 is to produce a combined image of the exit windows of the laser on the ground, thereby producing a top hat image on the ground of specified diameters for each color. The top-hat spatial profile allows for the maximum energy within the desired inscribed circle, while maintaining the highest uniformity across the circle.

After exiting the exit windows, the two beams 250 and 252 are directed into their conditioning legs. The conditioning optics can each have a single moveable stage which moves lenses along the axis of the beam to individually set the diameter of the beam image sizes of the beams at the ground. In the 532 nm leg, for example, the beam 250 can pass through a fixed lens 206, reflect off two mirrors 208 and 210, used to steer into the divergence control fixed lens 212 and moving lens 214, which is on a stage used to control the spot size on the ground. In the 1064 nm leg, the beam 252 passes through a fixed lens 216, reflects off two mirrors 218 and 220, used to steer into the divergence control fixed lens 222 and moving lens 224, which is on a stage used to control the spot size on the ground. The optics of the zoom can be designed to allow the imaging from the exit windows to the ground to be maintained while the diameter of the images are adjusted. Each channel can have a flip in shutter 226 and 228, which are used for eye safety and to allow the system to operate without any visible light coming out during operation. At the end of the 532 nm zoom leg there can be a mirror 230 which, along with a beam combiner optic 232, aligns the 532 nm beam with the 1064 nm beam, such that the beams are concentric and pointing in the same direction, ensuring that the spots are sufficiently concentric on the ground. After the beam combiner optic 232, there can be a set of two steering mirrors 234 and 236 to align the combined beams to the final beam expander, which has two lenses, the first of which is on the output of the transmit module 238.

Referring now to FIG. 18 the second optic of the final expander 240 is the last optic before a pair of galvanometer controlled mirrors 242 and 244. The galvanometer controlled mirrors are used to direct the combined beams to scan the beam in conjunction with the receive scanner to illuminate the area of the ground which will be viewed by the receiving system 100.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. An airborne LiDAR bathymetry system, comprising:
   a receiver system, the receiver system comprising:
      an objective;
      a reflective aperture relay;
      a scanning wobble mirror; and
      a down-collimating telescope;
   a detector system, comprising;
      a plurality of detectors, wherein each of the plurality of detectors operates at a unique single wavelength, wherein one of the plurality of detectors comprises a Geiger mode array detector; and
      a Geiger-mode avalanche photodiode (GmAPD) reformatter coupled to the Geiger mode array detector, the GmAPD reformatter comprising a splitting mirror, first and second imagers, a combining mirror, and a relay imager; and
   a laser transmission system, comprising:
      a laser to emit light beams at a first and second wavelength; and
      a laser transmitter module.

2. The airborne LiDAR bathymetry system of claim 1, wherein light collected by the objective from a point on the ground is at a NADIR angle of about 8 degrees.

3. The airborne LiDAR bathymetry system of claim 2, wherein the scanning wobble mirror is rotatably positioned on an optical axis of the receiver system.

4. The airborne LiDAR bathymetry system of claim 3, wherein rotation of the scanning wobble mirror about the optical axis processes the light collected by the object to return the light to being parallel to the optical axis.

5. The airborne LiDAR bathymetry system of claim 1, wherein the down-collimating telescope is to direct light from the scanning wobble mirror to the detector system.

6. The airborne LiDAR bathymetry system of claim 1, wherein the detector system comprises a plurality of dichroic beamsplitters.

7. The airborne LiDAR bathymetry system of claim 6, wherein the plurality of detectors comprises a first detector to detect a 647 nm wavelength, a second detector to detect a 532 nm wavelength, a third detector to detect a 1064 nm wavelength, a shallow green detector, and a deep green detector.

8. The airborne LiDAR bathymetry system of claim 1, wherein the Geiger mode array detector comprises a rectangular array.

9. The airborne LiDAR bathymetry system of claim 1, wherein the laser is to generate pulses having a pulse width of about 1.1 ns and a pulse frequency of about 20 kHz.

10. An airborne LiDAR bathymetry system, comprising:
a receiver system, the receiver system comprising:
an objective;
a reflective aperture relay;
a scanning wobble mirror; and
a detector system, comprising;
a first detector to detect a 647 nm wavelength;
a second detector to detect a 532 nm wavelength;
a third detector to detect a 1064 nm wavelength;
a shallow green detector;
a deep green detector;
a Geiger mode array detector;
a Geiger-mode avalanche photodiode (GmAPD) reformatter coupled to the Geiger mode array detector, the GmAPD reformatter comprising a splitting mirror, first and second imagers, a combining mirror, and a relay imager; and
a laser transmission system comprising a laser and a laser transmitter module, wherein the laser transmitter module comprises a first conditioning leg and a second conditioning leg.

11. The airborne LiDAR bathymetry system of claim 10, wherein each of the first conditioning leg and the second conditioning leg comprise a fixed lens, at least one mirror, and at least one moving lens.

12. The airborne LiDAR bathymetry system of claim 11, further comprising an expander comprising a first galvanometer controlled mirror and a second galvanometer controlled mirror.

13. A method of aerial surveying, comprising:
mounting an airborne LiDAR bathymetry system to an aircraft;
flying the aircraft at an altitude of at least around 10,000 feet; and
collecting topographic data and bathymetric data by the airborne LiDAR bathymetry system, wherein the airborne LiDAR bathymetry system comprises a receiver system, a detector system, and a laser transmission system; and
wherein the receiver system comprises an objective, a reflective aperture relay, a scanning wobble mirror, and a down-collimating telescope; and
the detector system comprises a Geiger mode array detector and a Geiger-mode avalanche photodiode (GmAPD) reformatter coupled to the Geiger mode array detector, the GmAPD reformatter comprising a splitting mirror, first and second imagers, a combining mirror, and a relay imager.

14. The method of claim 13, wherein the detector system further comprises a plurality of additional detectors, wherein each of the plurality of detectors operates at a unique single wavelength.

15. The method of claim 13, wherein the laser transmission system comprises laser emitting light beams at a first and second wavelength and a laser transmitter module.

16. The method of claim 13, further comprising flying the aircraft at about 160 knots.

17. The method of claim 13, wherein the airborne LiDAR bathymetry system has a swath width of about 850 meters.

18. The method of claim 13, wherein the aircraft is an unmanned aerial vehicle.

* * * * *

UNITED STATES PATENT AND TRADEMARK OFFICE
CERTIFICATE OF CORRECTION

Page 1 of 1

PATENT NO. : 11,125,865 B2
APPLICATION NO. : 16/889087
DATED : September 21, 2021
INVENTOR(S) : Nathan Lee Hopper et al.

It is certified that error appears in the above-identified patent and that said Letters Patent is hereby corrected as shown below:

In the Claims

Claim 14, Column 18, Line 25, change "of detectors" to --of additional detectors--.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*